United States Patent
Assadikhomami et al.

(10) Patent No.: US 11,308,025 B1
(45) Date of Patent: Apr. 19, 2022

(54) STATE MACHINE BLOCK FOR HIGH-LEVEL SYNTHESIS

(71) Applicant: Stephen Melvin, Vancouver (CA)

(72) Inventors: Shadi Assadikhomami, Vancouver (CA); Tor Aamodt, Vancouver (CA)

(*) Notice: Subject to any disclaimer, the term of this patent is extended or adjusted under 35 U.S.C. 154(b) by 57 days.

(21) Appl. No.: 16/946,154

(22) Filed: Jun. 8, 2020

Related U.S. Application Data

(63) Continuation of application No. PCT/US2018/064803, filed on Dec. 10, 2018.

(60) Provisional application No. 62/596,319, filed on Dec. 8, 2017.

(51) Int. Cl.
| | |
|---|---|
| *G06F 17/18* | (2006.01) |
| *G06F 5/01* | (2006.01) |
| *G06F 15/80* | (2006.01) |
| *G06F 9/445* | (2018.01) |

(52) U.S. Cl.
CPC .......... *G06F 15/80* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,215,327 B1* | 4/2001 | Lyke ................. | H03K 19/17796 326/10 |
| 7,671,627 B1* | 3/2010 | Somani ............... | G06F 11/1407 326/46 |
| 2004/0015882 A1* | 1/2004 | Peter Tang .............. | G06F 7/544 717/129 |
| 2006/0039372 A1* | 2/2006 | Sarkinen ................ | H04Q 11/04 370/395.5 |
| 2011/0072238 A1* | 3/2011 | Mimar ................. | G06F 15/8076 712/22 |
| 2012/0185734 A1* | 7/2012 | Gilkerson ........... | G06F 9/30123 714/45 |

* cited by examiner

Primary Examiner — Hyun Nam
(74) Attorney, Agent, or Firm — Stephen W. Melvin

(57) ABSTRACT

An architecture for a Field Programmable Gate Array (FPGA) that better supports the designs of finite state machines (FSMs) generated by High-Level Synthesis (HLS) tools. The architecture is based on categorizing states of a FSM into branch free path states and independent states. A memory unit stores next state information for independent states and an accumulator unit computes next state information for branch free path states. A control unit selects the next state based on either the memory unit or the accumulator unit. An input sequence encoder encodes external inputs and current state values into encoded sequence signals that are input to the memory unit. Also disclosed is a state assignment algorithm that assigns state values to states of the FSM by first identifying branch free paths that terminate on the same state and then eliminating overlap between paths. States along the same branch free path are assigned sequential values.

29 Claims, 20 Drawing Sheets

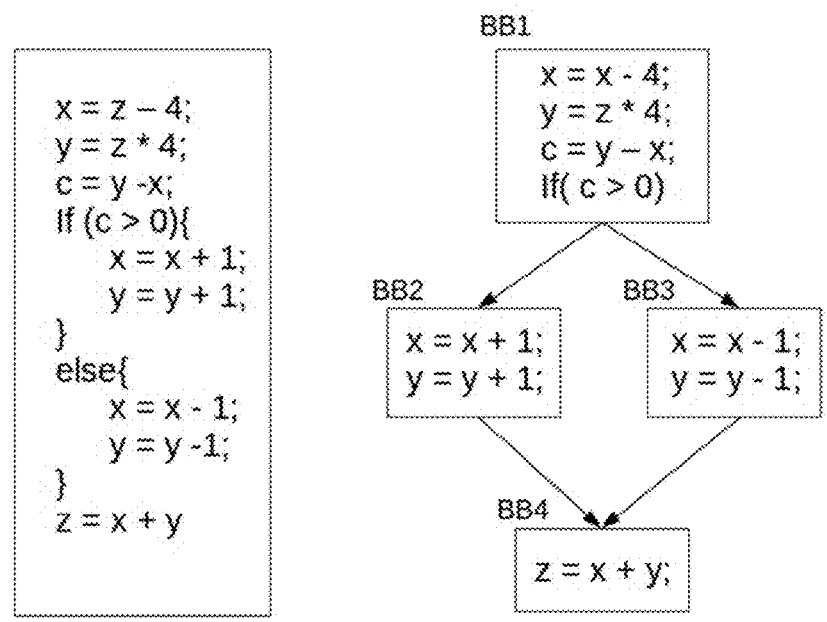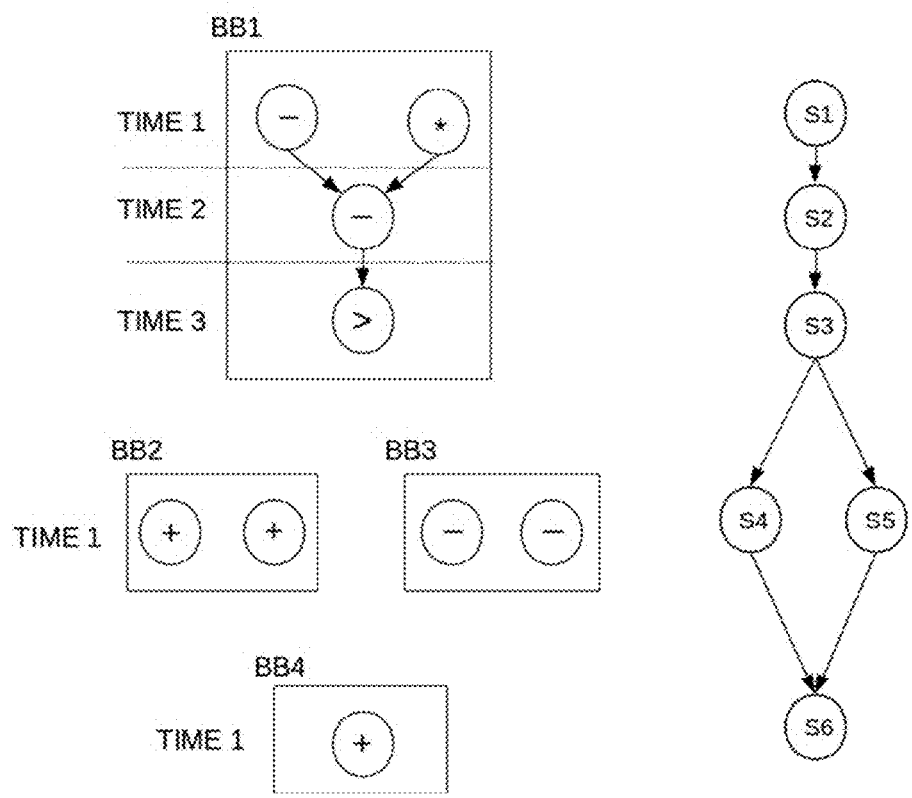
Fig. 10

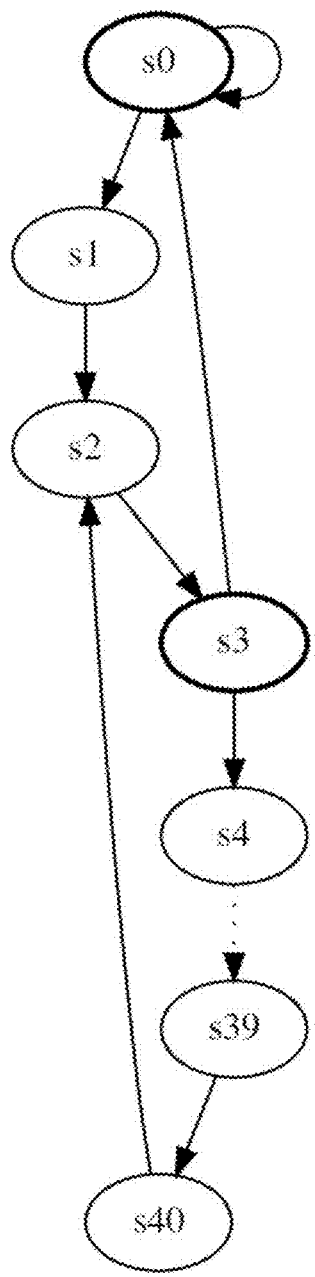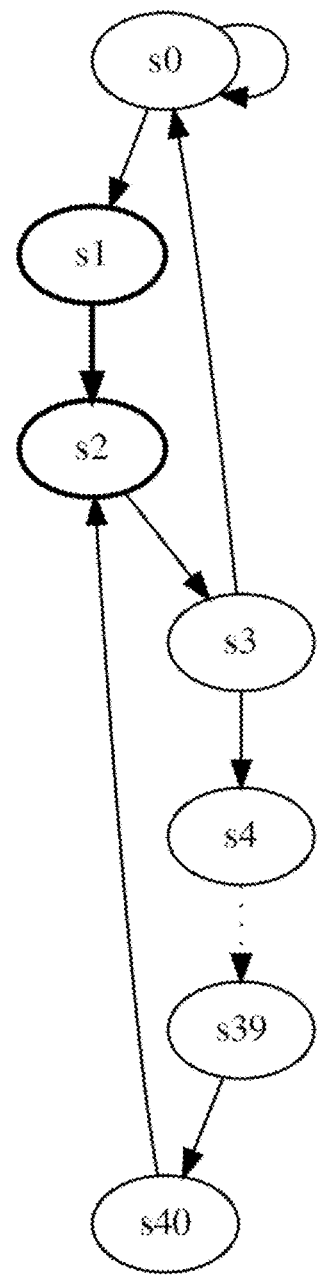
Fig. 18A                    Fig. 18B

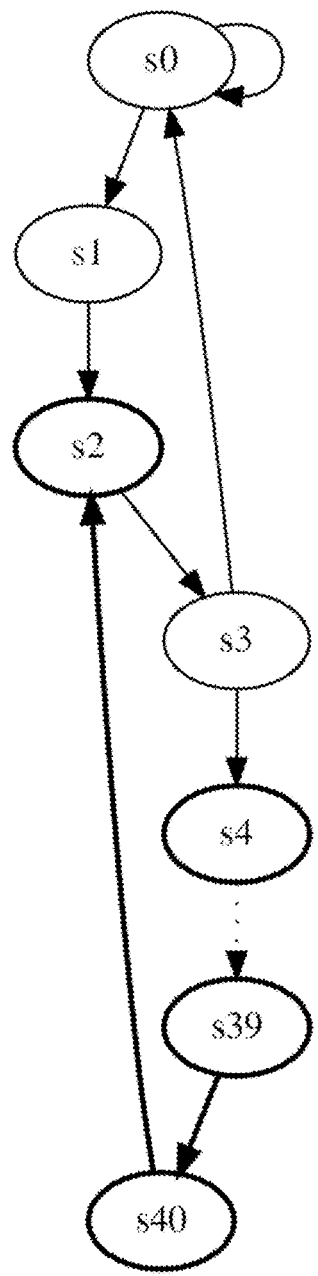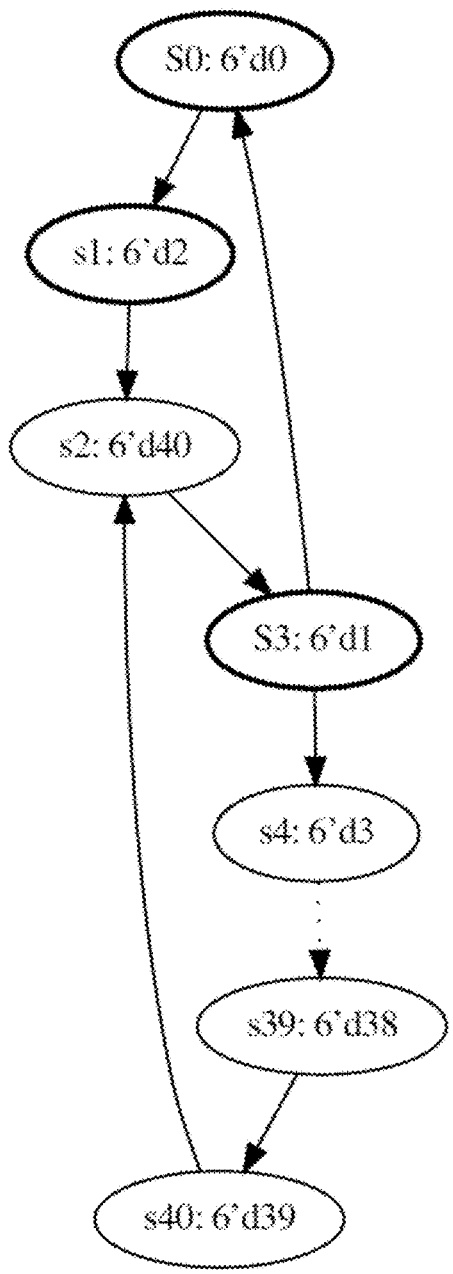
Fig. 18C                    Fig. 19

STATE MACHINE BLOCK FOR HIGH-LEVEL SYNTHESIS

RELATED APPLICATIONS

This application is a continuation of PCT Application No. PCT/US18/64803, filed on Dec. 10, 2018, and claims priority to U.S. Provisional Application No. 62/596,319, filed on Dec. 8, 2017, both of which are incorporated herein by reference.

BACKGROUND

Since their emergence, computing systems have undergone a series of revolutionary improvements in their performance, energy efficiency and cost-effectiveness. These improvements were achieved by architectural innovations and advancements in the semiconductor industry. Advancements in semiconductor technologies provide large improvements to computing systems by drastically increasing the amount of processing capability per unit of area and power. Historically, these advancements have followed Moore's Law, which states that the number of transistors on a chip will double approximately every two years and Dennard Scaling, which states that the power density of transistors remains constant as their size scales down which enables smaller and faster transistors. However, in recent years, Moore's Law and Dennard Scaling have slowed, resulting in diminishing returns from semiconductor improvements.

Additionally, to broaden the scope of applications able to benefit from such computing systems, architectures were designed with generality in mind, such as the CPU. However, due to the slowdowns in the rate of improvements for computing systems, there has been a shift towards using alternative architectural designs and specialized hardware accelerators to keep up with the growing computational demands of today's applications.

Hardware accelerators are customized circuits that are designed for performing a particular set of tasks. They have shown great potential to improve the performance and energy efficiency of applications by eliminating the overheads that come with having a more general purpose architecture. Graphic Processing Units (GPUs), Application-Specific Integrated Circuits (ASICs), Digital Signal Processors (DSPs), and Field Programmable Gate Arrays (FPGAs) are examples of the most common hardware accelerators (see for example Y. S. Shao and D. Brooks, Research Infrastructures For Hardware Accelerators, *Synthesis Lectures on Computer Architecture,* 10(4):1-99, 2015).

These accelerators range in their level of specialization and programmability. Similar to CPUs, GPUs offer a high degree of programmability, however, are designed to accelerate a class of applications with large amounts of data-level parallelism. In contrast, ASICs are designed to perform a specific set of tasks with dedicated hardware at the cost of little to no programmability. FPGAs bridge the gap between programmable processors and dedicated hardware accelerators by providing a reconfigurable and programmable hardware platform. FPGAs improve the flexibility over ASICs, while maintaining a portion of the improvements in performance and energy efficiency of a hardware design compared to a general purpose architecture.

More recently, FPGAs have been gaining popularity in domains they have not typically been used for, such as cloud computing. Some of the world's biggest datacenters, such as Microsoft and Baidu, are now deploying FPGAs in their servers, and Amazon is now offering FPGA cloud instances in their Amazon Web Services platform. Additionally, with the acquisition of Altera by Intel in 2015, FPGAs may become more closely tied to general purpose architectures, making them more accessible and increasing the use in new markets, such as Cloud computing.

FPGAs are traditionally programmed using hardware design languages (HDLs), such as Verilog or VHDL. Hardware design is notoriously more difficult compared to software development. This is one of the main issues with using FPGAs for accelerating large scale applications. However, recent advances in high-level synthesis (HLS) significantly increase the productivity of hardware design by enabling the designers to use higher level software programming languages, such as C/C++ and OpenCL, which makes FPGAs easier to use for accelerating larger scale applications. Therefore, HLS is now becoming a part of the main hardware design flow (see for example J. Cong, B. Liu, S. Neuendorffer, J. Noguera, K. Vissers, and Z. Zhang, "High-Level Synthesis For FPGAs: From Prototyping To Deployment," *IEEE Transactions on Computer Aided Design of Integrated Circuits and Systems,* 30(4):473-491, 2011 and Xilinx, *Vivado High-Level Synthesis,* http://www.xilinx.com/products/design-tools/vivado/). Embodiments of the present invention improve the architecture of FPGAs to better tune them for HLS design flow.

The FPGA architecture consists of an array of generic programmable logic blocks and programmable routing switches that enables them to implement any logic function. This flexibility comes with the cost of area, performance, and power overhead that causes an FPGA implementation of a given design to typically be at least an order of magnitude larger than an ASIC implementation, with a critical path delay ratio of about three to four (see for example I. Kuon and J. Rose, "Measuring the Gap Between FPGAs and ASICs," *IEEE Transactions On Computer Aided Design Of Integrated Circuits And Systems,* 26 (2):203-215, 2007). To bridge this gap, FPGA designers have introduced hard blocks such as multiplier/accumulator, block memories, and floating point units to modern FPGA architecture to mimic the efficiency of ASICs for a common set of operations (see for example M. Langhammer and B. Pasca, "Floating-Point DSP Block Architecture for FPGAs," *Proceedings of the 2015 ACM/SIGDA International Symposium on Field-Programmable Gate Arrays*). Hard blocks are ASIC-like hardware units that are less programmable, but more efficient than programmable logic blocks. Despite their efficiency improvements, the area of underutilized hard blocks is wasted, therefore, the hard block architecture must include function units and logic operations that are commonly used among a representative set of important FPGA applications.

Hard blocks on FPGA architectures have been designed to accelerate the operations that are common among the original application domains that were using FPGAs. However, the recent shift to use FPGAs in new domains with varying processing requirements means that there are other common operations among these new application domains that can benefit from being mapped to hard blocks. Also, the automated nature of HLS tools to generate hardware designs as opposed to a human hardware designer, means that special structures in hardware are generated that can be exploited by new hard blocks.

Embodiments of the present invention can be applied to the controller unit hardware generated by HLS tools, which often generate large explicit controller units that are modelled by finite state machines (FSMs). These control units can have a big influence on the total area of the design in cases where the realization of the data path requires a large number of states and control signals (see for example C. Menn, O. Bringmann, and W. Rosenstiel, "Controller Estimation For FPGA Target Architectures During High-Level Synthesis," *Proceedings Of The 15th International Symposium On System Synthesis*, pages 56-61, ACM, 2002). An analysis of the characteristics of the finite state machines that are generated by HLS tools illustrates that these state machines share common behaviors that can be exploited to design an alternative hardware implementation for such FSMs. Embodiments of the present invention reduces the area implementation of the next state generation logic in FSMs and may reduce its critical path delay as well.

Embodiments of the present invention are based on identifying common characteristics among state machines generated by HLS tools and implementing a novel architecture to improve area efficiency of next state calculation logic in FSM implementation without affecting performance. Also, a novel state encoding technique which exploits certain properties of HLS-generated FSMs is utilized.

The following acronyms are used herein:
CPU Central Processing Unit
GPU Graphic Processing Unit
DSP Digital Signal Processor
ASIC Application-Specific Integrated Circuit
HLS High-Level Synthesis
FPGA Field Programmable Gate Array
FSM Finite State Machine
CDFG Control/Data Flow Graph
DCG Directed Cyclic Graph
RAM Random Access Memory
LUT Look-Up Table
HDL Hardware Description Language
RTL Register-Transfer Level
CAD Computer Aided Design
SOC System On a Chip

BRIEF DESCRIPTION OF THE DRAWINGS

FIG. 10 illustrates an example of the process of equivalent FSM construction.
FIG. 18A illustrates an original state diagram.
FIG. 18B illustrates a branch-free path.
FIG. 18C illustrates a second branch-free path.
FIG. 19 illustrates a new encoding of states.

SUMMARY

Figure 1:
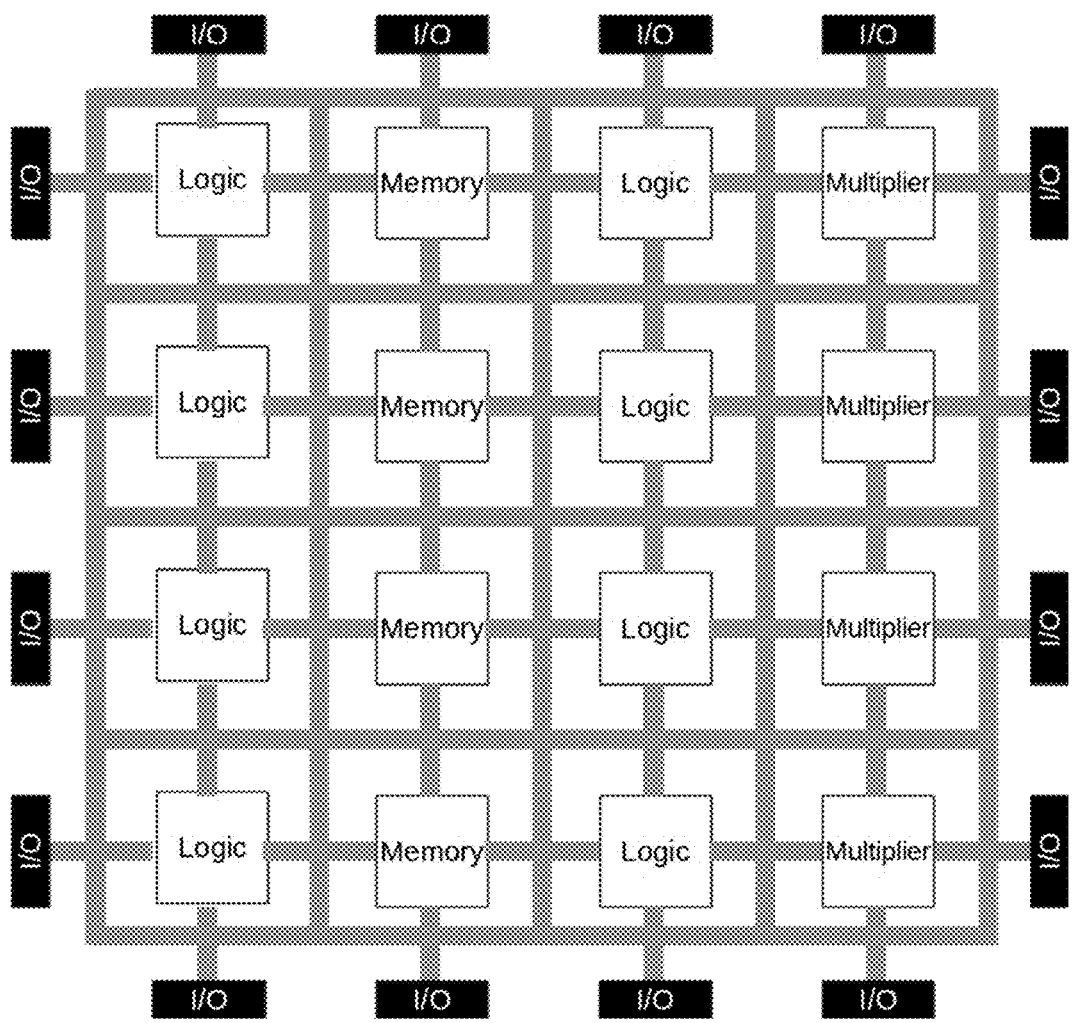
FIG. 1 illustrates a basic FPGA architecture.

With the recent slowdowns in traditional technology scaling, hardware accelerators, such as Field Programmable Gate Arrays (FPGAs), offer the potential for improved performance and energy efficiency compared to general purpose processing systems. While FPGAs were traditionally used for applications such as signal processing, they have recently gained popularity in new, larger scale domains, such as cloud computing. However, despite their performance and power efficiency, programming FPGAs remains a hard task due to the difficulties involved with the low-level design flow for FPGAs. High-Level Synthesis (HLS) tools aim to assist with this time-consuming task by supporting higher level programming models which significantly increases design productivity. This also makes the use of FPGAs for large scale design development for evolving applications more feasible.

Embodiments of the present invention involve modifying the current FPGA architecture to better support the designs generated by HLS tools. A specialized mix-grained architecture is utilized for Finite State Machine (FSM) implementation that can be integrated into existing FPGA architectures. This mix-grained architecture exploits the characteristics of the controller units generated by HLS tools to reduce the control-path area of the design. Embodiments of the present invention reduce the area of the next state calculation in FSMs by more than three times without impacting the performance and often reducing the critical path delay of the next state calculation in FSMs.

Programming low-level, dedicated hardware computing systems, such as Field-Programmable Gate Arrays (FPGAs), is more challenging and time consuming compared to programming higher-level software for general-purpose processors. Despite the difficulties associated with programming hardware, FPGAs still remain an appealing solution over general-purpose processors for many applications due to their higher efficiency. High-Level Synthesis (HLS) aims to ease the hardware programming by enabling the use of higher-level software languages to program FPGAs. However, there is generally a trade-off between programmability and efficiency when using HLS tools, which can often result in a less efficient hardware design than programming FPGAs using low-level programming languages. Embodiments of the present invention narrow the gap between programmability and efficiency when programming FPGAs using HLS tools by utilizing a novel implementation that exploits common properties of HLS-generated designs to improve FPGA efficiency by reducing the total area of the hardware design.

Analysis of the control-unit portion of RTL designs that are generated by HLS tools is described below. HLS-generated control units, modeled by finite-state machines, often have a large influence on the total area of the design in applications where data-path realization requires a large number of states and control signals. These FSMs demonstrate common properties that can be exploited to improve the area of FSM implementations. Embodiments of the present invention involve a novel mix-grained architecture that takes advantage of these characteristics to improve the total area for implementing the next state calculation logic in FSMs. Some embodiments of the present invention can be integrated to modern FPGA architectures. Also utilized in some embodiments is a new state assignment technique that enables FSMs to better map to the architecture. Illustrated below is an evaluation of an embodiment of the present invention on a group of RTL designs generated by a commercial HLS tool, demonstrating that the embodiment is on average three times smaller than LUT-based FSM implementations on a baseline FPGA. The reduction in area is achieved without affecting the performance of the design.

DETAILED DESCRIPTION

FPGA Architecture

A traditional FPGA architecture consists of an array of generic logic blocks that are connected via configurable routing channels. The main components of these logic blocks are n-input (typically 6-input) Look-Up Tables (LUTs), small one-bit hard adders, and optional flip-flops that enable registering the output of the block. An n-input LUT can be configured to implement any logic function that maps the n-bit input to a 1-bit output. Therefore, using LUTs in logic blocks turns them into generic flexible blocks that are capable of implementing any logic function (see for example I. Kuon, R. Tessier, and J. Rose, *FPGA Architecture: Survey And Challenges, Foundations And Trends In Electronic Design Automation,* 2(2): 135-253, 2008).

In modern FPGA architectures some of these generic blocks are replaced by hard blocks such as multiply-add, floating point operations, and memory blocks to improve the efficiency of these specific set of operations. A basic FPGA architecture is shown in FIG. 1 (from I. Kuon, R. Tessier, and J. Rose, *FPGA Architecture: Survey And Challenges, Foundations And Trends In Electronic Design Automation,* 2(2): 135-253, 2008).

Finite State Machines

Figure 2:
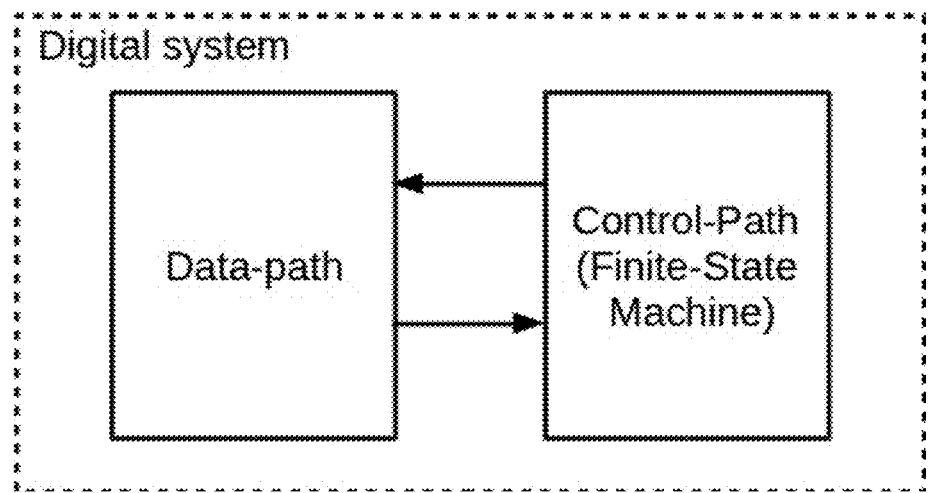
FIG. 2 illustrates a general block diagram of digital circuits.

Logic circuits consist of two main parts: data-path and control-path. The control-path is also sometimes referred to as the control unit. The general block diagram of digital circuits is shown in FIG. 2. The data-path can be described as functional units that perform the computational tasks (data operations) in an application. The control unit, on the other hand, generates the control signals required to direct the operation of the data-path according to the timing constraints, data, and control dependencies in an application. Finite state machines are a common way to describe the control path in logic circuits. As the name suggests, an FSM is composed of a limited set of states and the corresponding transitions between these states. Each state corresponds to a specific state in the real design. The transition between these states happens based on the current state of the system and the set of inputs to the FSM. Each state has a set of associated control signals that are dependent on the current state of the system and, potentially, the input signals. In a Moore FSM the output signals are defined only based on the current state of the system, where as in a Mealy FSM both inputs and current state are used to determine the value of output signals.

A state transition table is one of the common ways of representing an FSM. The state transition table is a truth table where the inputs and current state form the input column of the table, while the output column contains the next state value and outputs of the FSM. It is a simple method to define the state transitions and the values of output signals based on the current state and inputs.

Figure 3:
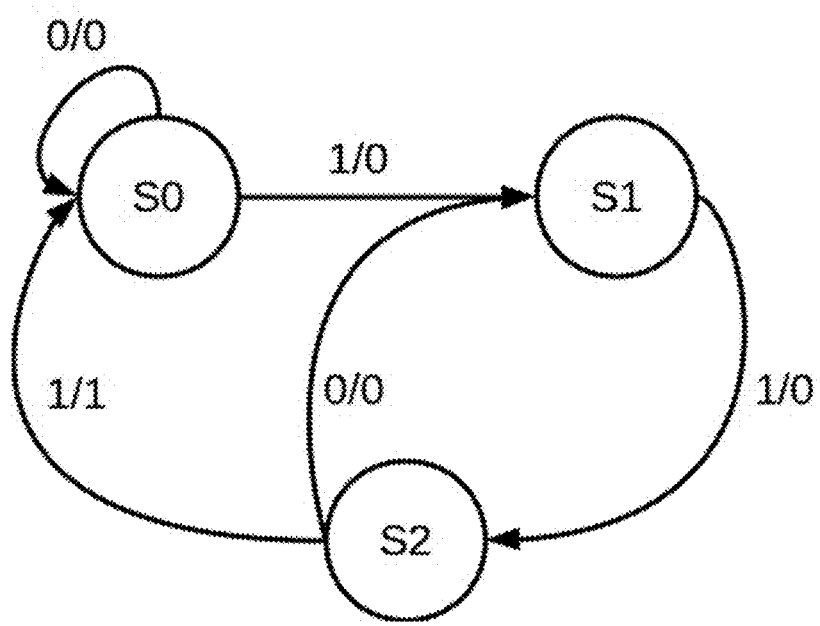
FIG. 3 illustrates the state transition graph of a Mealy FSM.

The state transition diagram is the equivalent graph-based representation of the state transition table (see for example G. D. Micheli, *Synthesis and Optimization of Digital Circuits*, McGraw-Hill Higher Education, 1994). A state transition diagram is a directed cyclic graph (DCG) G=(V, E) where each vertex $v_i \in V$ represents a unique state and each edge $e_{ij} \in E$ shows a transition from the corresponding state $v_i$ to the state $v_1$. The edge labels indicate the input sequence that causes the corresponding transition. Depending on the FSM model, Mealy or Moore, the output of each states will be either part of the edge or vertex label respectively. FIG. 3 illustrates the state transition graph of a Mealy FSM.

Figure 4:
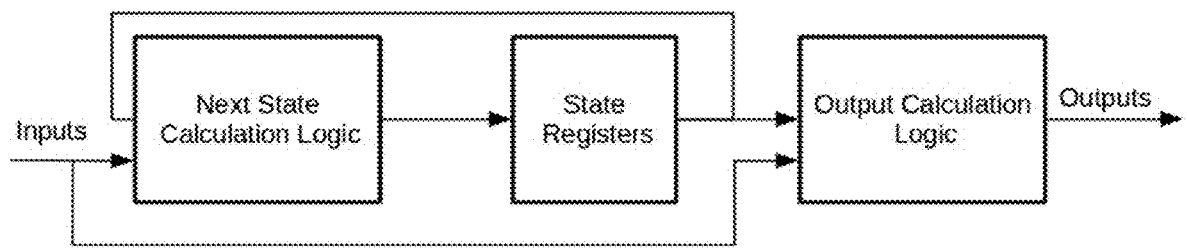
FIG. 4 illustrates the general structure of finite state machines.

FIG. 4 illustrates the general structure of finite state machines. It consists of state registers to hold the current state value, and combinational logic to calculate the next state value and output signals. There are two main approaches to implement FSMs on FPGAs, a LUT-based implementation and a RAM-based implementation. A LUT-based implementation is a common way to implement FSMs on FPGAs. In this approach, the combinational logic is implemented using FPGAs' LUT-based logic blocks. However, the flexibility of LUTs to implement any logic function comes at cost of increased area, power, and performance. Logic minimization algorithms and state assignment techniques are used to find optimal combinational circuits, which realize the state transfer function and output function.

After embedded block RAMs were introduced to FPGA architectures, many investigated the benefits of using block RAMs as an efficient method for implementing FSMs (see for example R. Senhadji-Navarro, I. Garcia-Vargas, and J. L. Guisado, "Performance Evaluation Of RAM-Based Implementation Of Finite State Machines In FPGAs," *Electronics, Circuits and Systems (ICECS), 2012 19th IEEE International Conference on,* pages 225-228, A. Tiwari and K. A. Tomko, "Saving Power By Mapping Finite-State Machines Into Embedded Memory Blocks In FPGAs," *Proceedings Of The Conference On Design, Automation And Test In Europe,* Volume 2, 2004, V. Sklyarov, "Synthesis And Implementation Of RAM-Based Finite State Machines In FPGAs," *Field-Programmable Logic and Applications: The Roadmap to Reconfigurable Computing,* pages 718-727, 2000, and V. Sklyarov, "An Evolutionary Algorithm For The Synthesis Of RAM-Based FSMs," *International Conference on Industrial, Engineering and Other Applications of Applied Intelligent Systems,* pages 108-118. Springer, 2002.)

Figure 5:
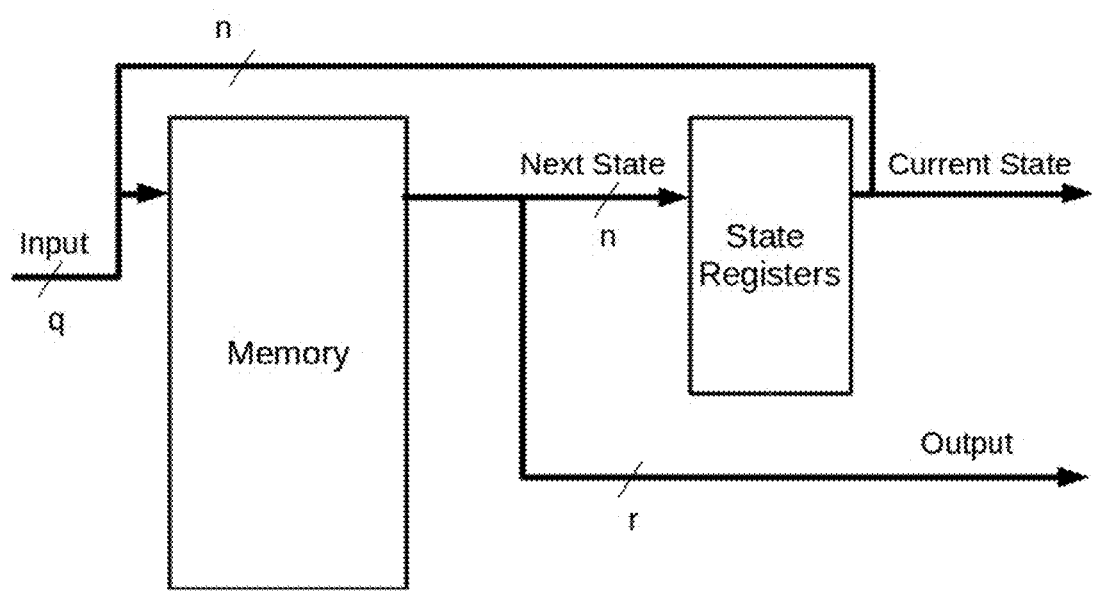
FIG. 5 illustrates an example of a RAM-Based FSM implementation.

RAM-based FSM implementations can reduce the area usage by utilizing less of the FPGA routing and logic resources, which consequently improves the area and power consumption of the design. FIG. 5 shows an example of a RAM-Based FSM implementation. In this example, the FSM has q inputs, r outputs, p states, and requires an n-bit encoding. The state value will be stored in an n-bit register and together with the input, form the address to the memory unit to look up the value of the next state and output signals. Such a memory unit will have $2^{n+q}$ entries of size (n+r) to accommodate the next state and output values for all the combinations of current state and input values. One potential problem with such implementation is the exponential growth in memory size with an increase in number of states and inputs. For the scenario where there are several inactive inputs at each states that do not contribute to the next state calculation, it is possible to utilize a selecting mechanism to choose the active inputs at each state to address the memory locations in order to avoid the unnecessary increase in the memory size.

Hardware Design Flow

Programming hardware tends to be more difficult compared to software development. The traditional hardware design flow requires designers to use low-level hardware description languages (HDLs) such as Verilog and VHDL, to directly describe a given high-level algorithm. This description is typically at register transfer level (RTL) where a circuit is described by its logic operation, registers, and their corresponding data flow. The RTL design will then be mapped to an FPGA using Electronic Design Automation (EDA) tools, which after synthesizing the RTL design into a gate-level netlist and applying the logic optimization techniques, try to map the design onto an FPGA architecture in an iterative manner.

The low-level nature of RTL design, various design constraints and requirements, and long EDA process makes hardware design a very challenging and time-consuming task compared to the typical sequential programming in software. Meanwhile, the large scale and evolving nature of applications in new domains, such as cloud computing, makes hardware design for applications in such domains even more challenging. FPGAs can be made into a more feasible solution by providing a mechanism to ease hardware programming, such as high-level synthesis (HLS).

High-Level Synthesis

High-level synthesis (HLS) tools try to assist with this issue by raising the level of abstraction and letting the designer use a high-level language such as C/C++ or OpenCL for describing the desired algorithm to generate an RTL design.

HLS tools are becoming increasingly popular due to the recent improvements in their underlying algorithms, which has enabled them to generate RTL designs that have comparable quality with a hand-coded RTL design by an expert hardware designer (see for example J. Cong, B. Liu, S. Neuendorffer, J. Noguera, K. Vissers, and Z. Zhang, "High-Level Synthesis For FPGAs: From Prototyping To Deployment," *IEEE Transactions on Computer Aided Design of Integrated Circuits and Systems,* 30(4):473-491, 2011). High-level synthesis tools use the control/data flow graph (CDFG) of a given program as the main starting point to generate the corresponding RTL design. Similar to the logic circuit described above, the generated hardware is composed of two main parts: (1) data path and (2) control path.

The data path corresponds to the operations and data flow in the given high-level program while also taking the resource constraints of the target FPGA architecture, such as number of available specific hardware units, into account. The control path is described using an FSM which is constructed after performing two main tasks: (1) scheduling and (2) binding. Scheduling is the process of identifying the cycle in which each operation can be performed given the timing/resource constraints of the target architecture and control and data dependencies in the input application (see for example J. Cong, B. Liu, S. Neuendorffer, J. Noguera, K. Vissers, and Z. Zhang, "High-Level Synthesis For FPGAs: From Prototyping To Deployment," *IEEE Transactions on Computer Aided Design of Integrated Circuits and Systems,* 30(4):473-491, 2011). Binding is the process of mapping the given operations and variables to hardware units that are capable of implementing them while also taking the resource constraints into account. For example, an addition operation is mapped to an adder on the FPGA. If the schedule allows for 20 additions to be performed on the same cycle given the data dependencies, but there are only ten hardware addition units, the binding task will modify the schedule to perform these operations over two cycles. In a scenario where same hardware unit is shared between multiple operations, the input sources to each operation and the output connections will be defined based on the output of the FSM.

Control Path Optimization

Embodiments of the present invention use specialized blocks for implementing Finite State Machines (FSMs) to improve the area efficiency and performance of the control unit portion of RTL designs generated by high-level synthesis tools. A novel configurable mixed-grained architecture is utilized that makes use of unique characteristics of the FSMs generated by HLS tools to reduce the silicon area that is required for FSM implementation. This is achieved without affecting the control unit performance and, in most of the cases, improves the critical path delay as well.

In the discussion that follows, analysis on selected characteristics of finite state machines is presented and it is shown that embodiments of the present invention make more efficient use of the silicon area compared to conventional LUT-based implementation of state machines. In addition, a state encoding technique and a technology mapping algorithm are shown that have been developed in order to better exploit the specialized FSM blocks of embodiments of the present invention.

Finite State Machine Analysis

In the discussion that follows we define and analyze specific characteristics of Finite State Machines that are exploited to design a custom FSM block. Following are preliminaries for the Finite State Machine analysis.

Definition 1. State Transition Diagram: Finite state machines can be represented by their state transition diagram. A state transition diagram is a directed cyclic graph (DCG) G=(V, E) where each vertex $v_i \in V$ represent a unique state and each edge $e_{ij} \in E$ shows a transition between two corresponding states (vertices). We refer to vertices and states interchangeably.

Definition 2. Directed Path: A directed path is a finite sequence of edges following the same direction which connect a sequence of vertices.

Definition 3. Vertex Degree: The degree of a vertex of a graph is defined as the number of edge incidents to the vertex. In DCGs, the vertex degree can be grouped into fan-in degree and fan-out degree which represent the number of incoming edges and outgoing edges of a vertex respectively.

Definition 4. Branch-Free Path: Given a DCG, we define a branch-free path to be a directed path where each vertex has at most one fan-out edge but can have more than one fan-in edge.

Figure 6:
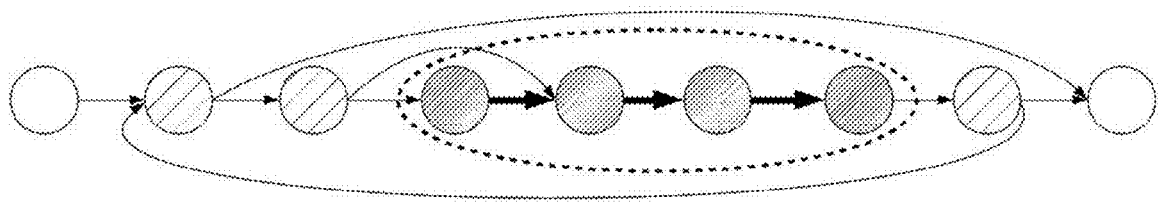
FIG. 6 illustrates an example of a graph with a branch-free path.

An example of a graph with a branch-free path is shown in FIG. 6. The states circled by the dashed line and with narrow shading constitute a branch-free path. The states with the wide shading have a fan-out degree of greater than one and are not part of the branch-free path. Note that vertices that belong to a branch-free path can have more than one fan-in edge.

FSM Characteristics

Using the definitions above, we now can describe two specific properties of FSMs that are exploited to reduce the area usage and improve critical path delay of FSM implementations.

Figure 7:
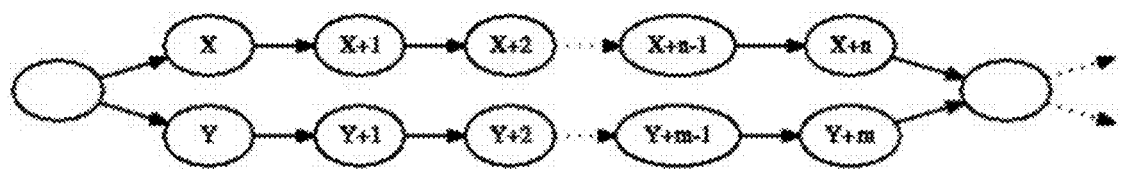
FIG. 7 illustrates an example of state encodings for states that belong to branch-free paths.

If the state transition graph of a finite-state machine has long branch-free paths, then consecutive states in each path can be assigned consecutive state values (state encoding) such that next state value can be calculated with a simple increment operation. This leads to a new state encoding where branch-free paths have a simple increasing state encoding. This is shown with an example in FIG. 7. The graph represents part of the state transition diagram of an FSM which contains two branch-free paths labelled with the shown encodings. Note that the blank states are not part of any branch-free path since they have fan-out degree of two. Consider the top path with the length equal to n, if the first state in this path is assigned the state encoding X, then following states in the path will be assigned X+1, X+2, ..., X+n−2, and X+n−1 until a non-branch-free state is reached. The same rule applies to the second path with the length equal to m where the first state of the path is assigned the state encoding Y and the following states in the path will be assigned Y+1, Y+2, ..., Y+m−2, and Y+m−1. Hardware implementation for such a state machine has an opportunity to reduce the silicon area, since the next state calculation logic for states that belong to branch-free paths can be realized with a simple adder along with small control logic in hardware.

Low Fan-Out Degree

For a given FSM, the maximum number of possible next states for any given state can be calculated using the following expression: $\min(2^q, p)$.

Where q is equal to the total number of inputs to the state machine and p represent the total number of states. However, not all of the input signals are active in different states, therefore the number of reachable states from a given state can be, and often is, far less than the maximum. For each given state, the fan-out degree represent the number of reachable states from that given state.

For state machines with an abundance of branch-free paths, the remaining states which are not part of any branch-free path form a smaller subset of the state machine. When the states that belong to this subset have low fan-out degree, there are advantages for a hybrid memory-based FSM implementation that is independent of the input size. Embodiments of the present invention utilize a small memory unit to implement the next state calculation for states that are not within a branch-free path and an arithmetic unit to compute the next state for states within a branch-free path.

HLS-Generated Finite State Machines

Figure 8:
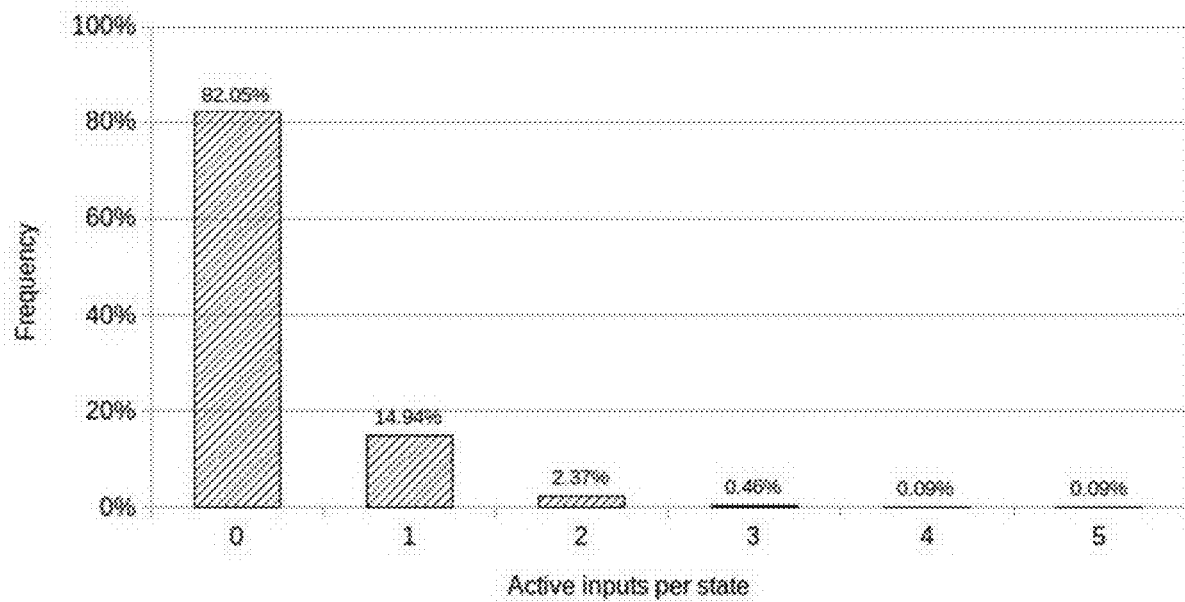
FIG. 8 illustrates the number of active inputs per state for HLS benchmarks.
Figure 9:
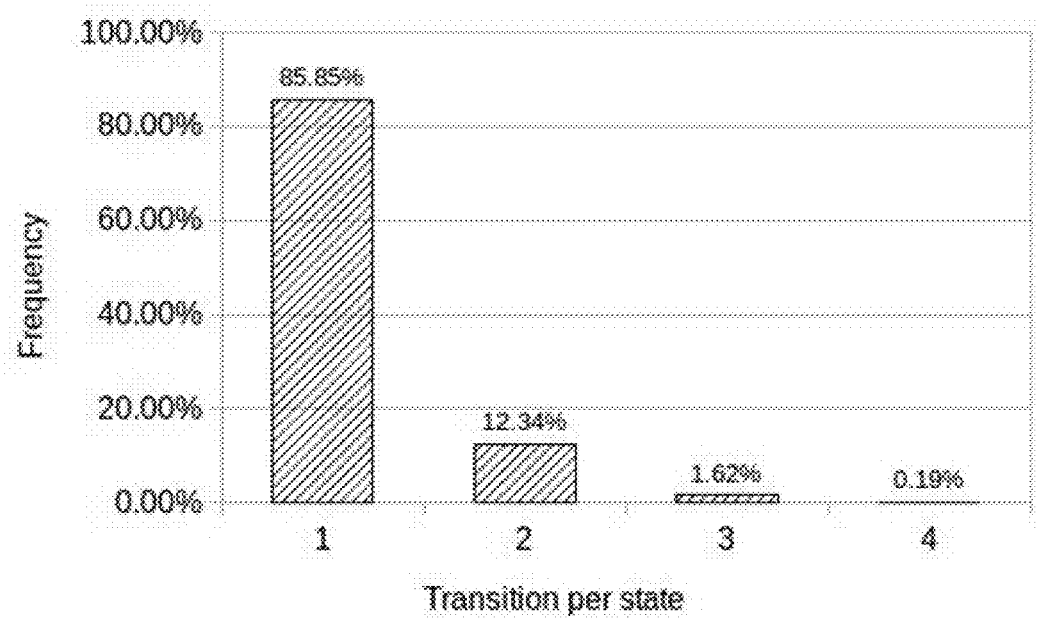
FIG. 9 illustrates the number of transitions per state for HLS benchmarks.

The results of an analysis on the finite state machines extracted from two sets of HLS benchmarks are presented in FIG. 8 and FIG. 9. FIG. 8 illustrates the number of active inputs per state calculated as an average over 46 FSMs extracted from 21 benchmarks generated by HLS. FIG. 9 illustrates edge distribution: the number of transitions per state calculated as an average over the same FSMs. The benchmarks were in two groups: MachSuite and HLS datacenter, the details of which are described in more detail below. The RTL code for these benchmarks was generated using Vivado HLS, an HLS tool by Xilinx.

For the MachSuite benchmarks, the default set of HLS optimization directives that were shipped with the benchmarks was used such as loop unrolling, loop pipelining, and memory partitioning. An analysis of the impact of applying HLS optimization directives on generated FSMs was performed by looking at three benchmarks from MachSuite. The HLS directives were obtained using the methodology and results described in C. Lo and P. Chow, "Model-Based Optimization of High Level Synthesis Directives," *26th International Conference on Field Programmable Logic and Applications (FPL)*, 2016, which aim to minimize the area-delay product of the generated RTL design. The results show that the size of FSMs and fraction of branch-free paths are not negatively impacted (i.e. the branch-free paths still exist and are a large fraction of total states). In fact, for these three benchmarks, the fraction of branch-free paths increases.

For the datacenter benchmarks, BZIP, Lucy, and SQLite (getToken function), HLS optimization directives were applied while generating the RTL design. For the remaining benchmarks/functions in this benchmark set, no optimization were applied. Based on the analysis discussed below, it is expected to find a similar behavior to the result shown for optimizing MachSuite.

FIG. 8 shows that more than 80% of the states in each FSM do not require any input and only have one possible next state, which means they belong to a branch-free path. FIG. 9, which shows the fan-out-degree (transitions per state) statistics also indicates that there is at most four reachable next states for any given state. Therefore, finite state machines coming from HLS-generated RTL codes can benefit from embodiments of the present invention.

Data Flow Height

The FSM analysis on the HLS benchmark sets illustrates two common patterns: low fan-out degree and long branch-free paths. The cause of the low fan-out degree and long branch-free paths in FSMs among all of the HLS generated RTL codes can be shown to be data dependent instructions and the latency of instructions within a basic block. To illustrate data-dependence leading to branch-free paths, one can look at the mechanisms used by HLS tools to generate the RTL code for a given application. As discussed above, HLS tools rely on the control/data flow graph (CDFG) of an application and consider the resource and timing constraints of the target hardware to perform scheduling. The outcome of scheduling is used to generate the control unit and, consequently, the FSM that will direct the operations of the data path.

To illustrate the impact of data-dependence on scheduling, we mimic the behavior of an HLS scheduler by constructing a simplified equivalent FSM of a given program from the control flow and data flow graph. This simplified equivalent FSM assumes that there are infinite resources on the FPGA, the latency of any instruction is one cycle, and that data-dependent instructions cannot take place on the same cycle. These simplifications aim to limit the scheduling to data dependent instructions.

FIG. 10 illustrates an example of the process of equivalent FSM construction. The following steps describe how the simplified equivalent FSM is constructed:

Step 1: Construct the control flow graph (CFG) of the program.

Step 2: Construct the data flow graph (DFG) for each of the basic blocks in the CFG. Each node of a DFG shows an operation and edges are representative of data dependencies among these operations.

Step 3: Apply unconstrained list scheduling separately on each of the data flow graphs, with the simplifications described above.

Step 4: Given that each of these data dependent operations may be performed by functional units that require appropriate control signals, each of these operations needs to be a separate state in the equivalent FSM. Replace every cycle of each scheduled DFG with a corresponding state in the equivalent FSM.

Step 5: Finally, connect the states to construct the equivalent FSM. For the states belonging to the same scheduled DFG (within a basic block), apply an edge directly between the states. To construct the transitions between states in different DFGs, replace each control edge between two basic blocks in the CFG with an equivalent edge between states in the FSM. The equivalent edge connects the last state of the predecessor basic block (i.e., cycle N of the DFG for the predecessor basic block) with the first state in the successor basic block (i.e., cycle 0 of the DFG for the successor basic block).

The equivalent FSM constructed by this approach is a simplified representation of the FSM that is generated by HLS tools for a given program. For example, multiple operations may be able to be performed on a single cycle, long latency instructions may result in multiple states, or there may be resources limitations in the number of operations that can occur per cycle. However, the simplified FSM maintains the impact of data dependence. This approach was used to perform analysis on the equivalent FSMs of the MachSuite benchmarks as well as the SPEC2006 INT benchmarks (see SPEC, *CPU* 2006, https://www.spec.org/cpu2006/). The MachSuite benchmarks were written for HLS while the SPEC2006 INT benchmark suite was not.

Figure 11:
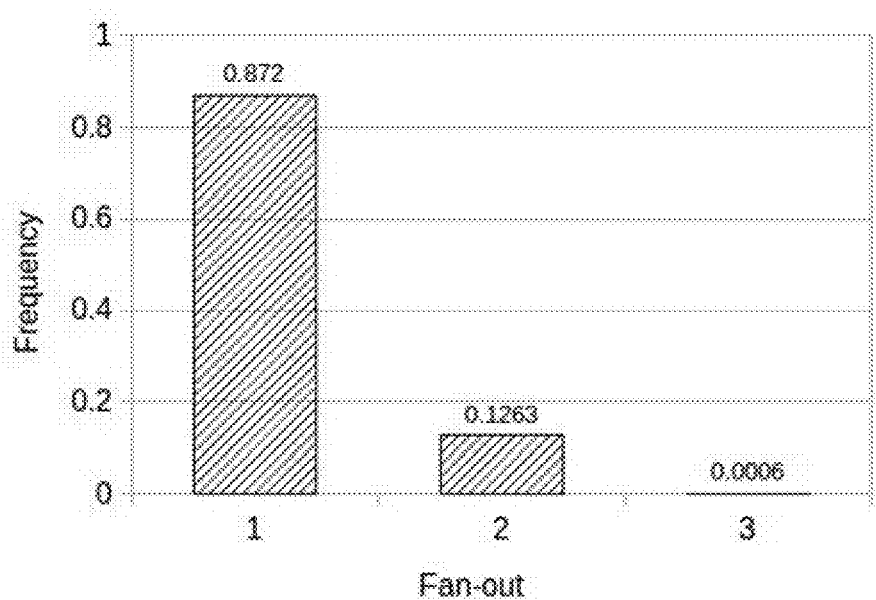
FIG. 11 illustrates the fan-out degree of the equivalent FSM for MachSuite benchmarks.
Figure 12:
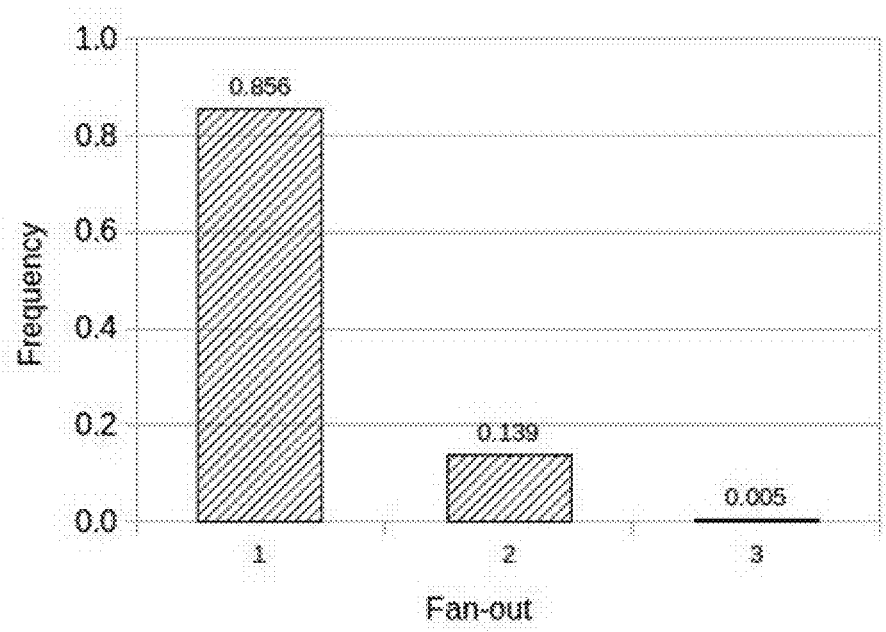
FIG. 12 illustrates the fan-out degree of the equivalent FSM for SPEC CPU2006 INT benchmarks.

FIG. 11 presents the fan-out degree of the equivalent FSM for the MachSuite benchmarks and FIG. 12 presents the fan-out degree of the equivalent FSM for the SPEC CPU2006 INT benchmarks. As can be seen, both benchmarks demonstrate very similar behavior in the fan-out degree, with over 85% of the states having a single next state. Based on the construction of the equivalent FSM, these single fan-out edges are caused by data dependencies, but they are independent of input as the timing schedule is predetermined in advance.

Although the simplifications in the equivalent FSM may affect the result of the fan-out degree experiment, the impact would mostly affect the number of states with fan-out degree equal to 1. The result of this experiment shows a very large ratio between single and multi-fan-out degrees. Hence, the equivalent FSM provides a good approximation of the actual FSM to highlight the existence of a large fraction of nodes with a single fan-out edge.

Specialized FSM Block

Embodiments of the present invention introduce a specialized hard block to FPGA Architecture that is designed to only implement the HLS-generated FSMs. Such specialized hard block is extremely efficient compared to the FPGA LUT-based logic blocks due to the reduced overhead that comes with the flexibility of LUT-based logic blocks. In alternative embodiments of the present invention, different portions of the FSM architecture are implemented as a specialized hard block and the other functionality is implemented as soft logic within the FPGA.

Figure 13:
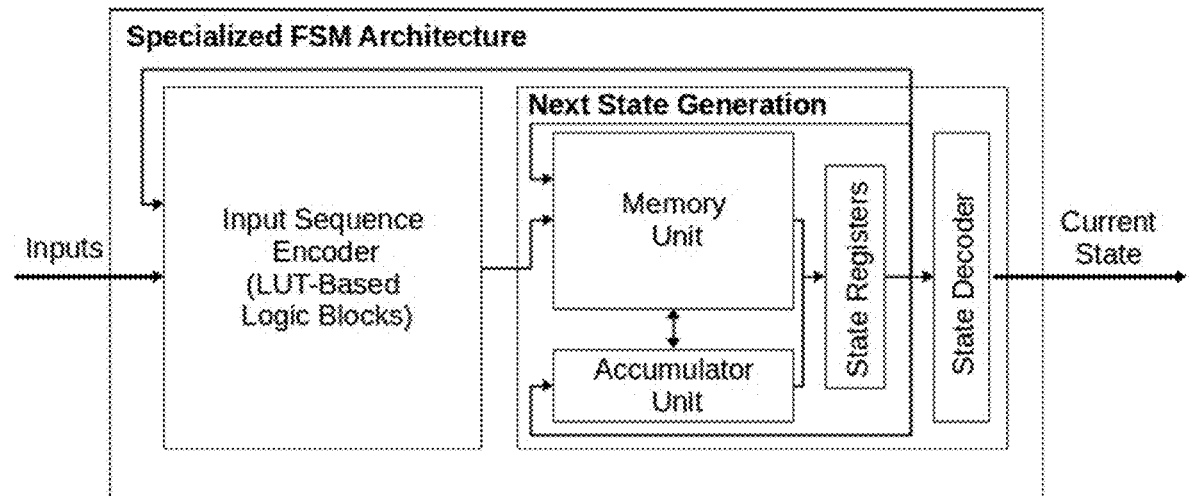
FIG. 13 illustrates the high-level architecture of an embodiment of the present invention.

Embodiments of the present invention consists of both fine-grained (soft) and coarse-grained (hard) logic that are connected via hard (or flexible FPGA) routing, which together form the mix-grained architecture. The high-level architecture is illustrated in FIG. 13. The coarse-grained part of this architecture implements the next state calculation and consists of two main units, the accumulator unit and the memory unit. The accumulator unit takes care of state calculation for the states that belong to the branch-free paths, while the memory unit stores the next states for the remaining states, along with some metadata that will be described later. As previously mentioned, these remaining states tend to have a low fan-out degree, which makes them well suited to be stored in memory, since fan-out degree directly corresponds to the number of entries per-state in memory. The fine-grained part of this architecture takes the current state and input signals and tries to minimize the address space of the memory unit, and hence, the memory size. As mentioned above, the reduction of the state address space occurs since the number of reachable states from a given state is often much less than the maximum possible number of reachable states. Below we describe the coarse-grained and fine-grained parts of embodiments of the present invention.

Input Sequence Encoder Unit

The input sequence encoder unit implements a configurable encoder that in some embodiments can use the FPGA soft logic. FIGS. 8 and 9 illustrate the advantages of having such unit. At each state of the state machine only a subset of input signals impact the state transition. This subset of inputs are called active inputs. FSMs extracted from the benchmarks sets have variable number of inputs ranging from 3 to 56, however, the number of active inputs at each state is much less for these benchmarks as described further below. As shown in FIG. 8, the number of state machine active inputs per state varies from 0 to 5, however, the number of next reachable states from a given state (i.e. number of fan-outs per node in the state transition graph) does not exceed 4. This means that the choice of next state, which corresponds to the memory address, can be represented by only 2 bits instead of 56. Therefore, a simple encoder is used that maps the possible large input sequence for the state machine to a smaller sequence of length $\log_2$ (maximum number of reachable states per state). This significantly reduces the size of the memory unit that is used for next state calculation as it enables avoiding storing don't care data for unreachable states. The input sequence encoder unit can be easily implemented on a LUT-based cluster as part of an FPGA. In alternative embodiments the input sequence encoder could be implemented as part of a specialized hard block or as part of a block RAM in an FPGA.

Coarse-Grained Fabric

The coarse-grained fabric corresponds to the "Next State Generation" block in FIG. 13. An analysis of the edge distribution of the state transition graphs in the benchmark suites discussed in more detail below shows an abundance of branch-free paths (i.e., states with only one next state where the transition between states is not input dependent). Below we describe an encoding technique that enables using a single accumulator in order to calculate the next state value for such states.

Figure 14:
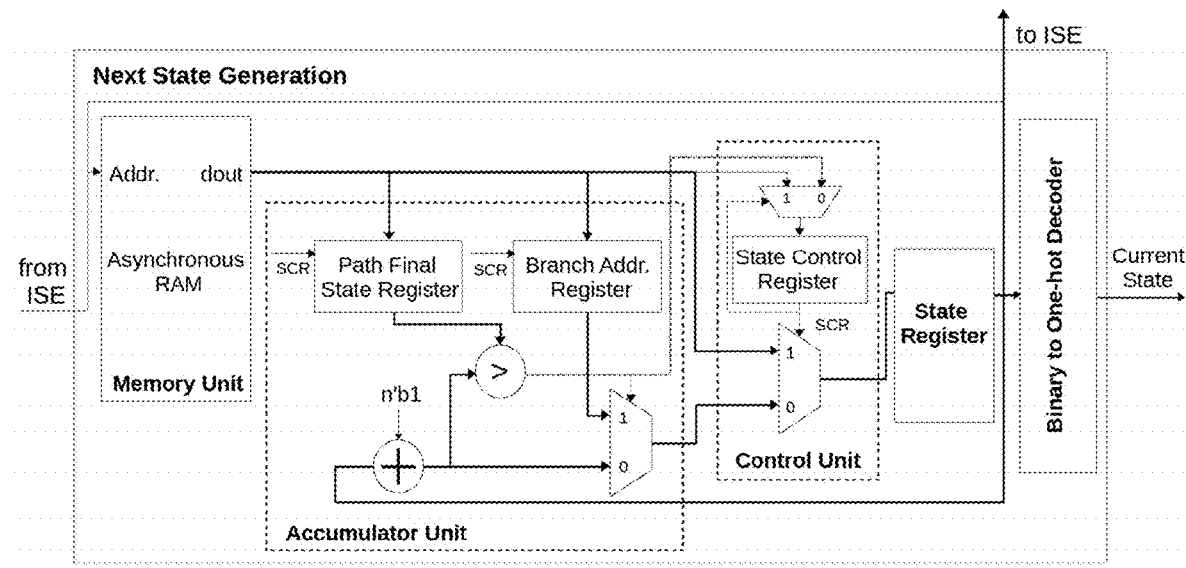
FIG. 14 illustrates a detailed breakdown of the next state generation block of an embodiment of the present invention.

FIG. 14 illustrates a detailed breakdown of the next state generation block shown in FIG. 13. Below we describe each of the components in more detail.

There are timing requirements for the FSM block that require delay of certain data. For example, metadata read from an entry in memory corresponds to the next state and in case of the branch-free paths, metadata is used for the entire path so a mechanism to save the metadata is used. Registers delay the metadata by one cycle such that they apply to the next state and in the case of the branch-free path to the l next following states where l is the length of the path. "Path Final State Register", "Branch Address Register", and "State Control Register" are the registers that are used for this purpose which are explained in detail below.

Accumulator Unit

This unit is responsible for calculating the next state values for the trailing input-independent states on a branch-free path. After applying the state encoding, the next state value for states that belong to a given branch-free path in a state transition graph can be calculated using a simple accumulator along with some extra information, which are described below:

Adder: The adder is the main part of the accumulator unit. It takes in the current state and increments the value to calculate the next state in the branch-free path. It has two inputs: a single 1-bit value set to one, and the current state value coming from the output of the state register. In alternative embodiments the adder could subtract one from the current state value or perform some other unary arithmetic operation that is accounted for by the state assignment algorithm discussed below.

Control Logic: While an adder is enough to calculate the next state value for the branch-free states, it is not sufficient to determine when we have reached the end of a branch-free path. Additionally, once we have reached the end of a branch-free path, we need to read the next state value from memory. However, the address to this state is not just the current state encoding, since the memory address space is separate from the state encoding for branch-free paths. Therefore, we use two metadata registers to store this information for each path.

The Path Final State Register is set to the state value of the last state on the path. This is used to mark the ending state of the path.

The Branch Address Register is set to the address we should read from the memory once we have reached the end of the branch-free path.

The Comparator is used to compare the values of the path final state register with the output of the accumulator, and then generates the control signal which decides if the next state value should come from the accumulator or the Branch Address Register.

Memory Unit

The memory unit is responsible for storing the next state value for the states that do not belong to a branch-free path along with some metadata to assist with the transition from the accumulator unit to memory unit. To avoid adding an extra cycle delay to the next state calculation, an asynchronous memory block can be used for this unit. The table below shows the content of a row in memory:

| Next State Value | Path Final State | Branch Target | State Control |
| --- | --- | --- | --- |

One row consists of four main fields: (1) Next State Value (2), Path Final State, (3) Branch Address, and (4) State Control bit. The first and fourth fields always have a valid value, however the second and third fields will only be valid in the case where next state belong to a branch-free path. In this case, the contents of these two fields will be registered into the registers described in the accumulator unit, as described above. The last field, state control bit, is used to determine if the source of the next state value should be the accumulator unit or memory unit. This field is registered into the control unit register that will be described below. Note that the Branch Target field need only be wide enough to select the states that are handled by the memory unit, so it may be narrower than the Next State Value and the Path Final State, which are wide enough to select any state in the finite state machine.

Because the memory unit utilizes only two fields for some entries, there is some unutilized space. For transitions where both current state and next state reside in memory, only the Next State Value and the State Control bits are utilized. In alternative embodiments, the memory unit is made more efficient by splitting it into two separate memory sub-units, one with a smaller width than the other to accommodate states which all their next states also reside in memory. States which have at least one next state that is an entry point to a branch-free path remain in the memory sub-unit with the larger width. This embodiment utilizes additional logic to decide which memory sub-unit should be active at a time (the multiplexer before the state register should select between 3 possible inputs, two coming from the two memory sub-units and one from the accumulator unit).

In another alternative embodiment, the memory unit is implemented such that the upper portion is only partially populated with memory cells. That is, the memory unit is built such that all locations above a certain address only store two fields with the other two fields hardwired to zero. Then, the state assignment algorithm will assign states such that states that have all of their next states in memory go to the addresses above the threshold. The area of the memory unit is reduced by the number of non-existent memory cells. The implementation can split the memory properly such that it is a good representative of what most of the FSMs would need.

The depth of the memory in the memory unit is dependent on the non-branch-free states and edge distribution and the width is based on the next state plus metadata. We describe in more detail below how the size the memory unit is determined in various embodiments of the present invention.

Control Unit

The control unit is responsible for selecting the source of the next state value between the accumulator unit and memory unit using a multiplexer which is controlled by the "State Control Register". The State Control Register can be set in two different ways: (1) The State Control Field of the memory unit for the given state, or (2) the result of the comparator in the accumulator unit which marks the termination of the branch-free path, as shown in FIG. 14. At any given time, either the memory unit or the accumulator unit is active and responsible for calculating the next state value.

The active unit is responsible for selecting whether the same unit is active on the next cycle or the other unit is active on the next cycle. This is implemented as a feedback loop from the State Control Register to the select signal of the multiplexer feeding the State Control Register. This continues to select the same unit until that unit signals a transition by toggling zero to one or vice versa.

State Decoder

Some embodiments of the present invention provide a binary to one-hot decoder at the output of this block to enable more efficient binary to one-hot conversion if required by the rest of the circuit.

Fracturable FSM Hard Blocks

The size of the finite state machines can vary significantly among different applications. As mentioned above, any hard block on FPGAs will be partially wasted if not fully utilized by the applications, leading to fragmentation in the hard blocks. Therefore, to be able to efficiently accommodate state machines with various number of states, "fracturable" FSM hard blocks can be utilized. The main idea behind having fracturable FSM blocks is to tailor the block size such that it accommodate the state machines with an average size while supporting combination of two blocks such that they can accommodate large FSMs that do not fit into just one block. To map a large state machine to multiple smaller combined blocks, the state machine is partitioned into multiple sub-state machines, and the architecture should enable fast transition between these blocks. Below is a discussion of partitioning state machines to two sub-machines which enables all the FSM benchmarks that are discussed to be accommodated, and this approach can be easily generalized to more partitions. In some embodiments of the present invention a single FSM is split and implemented in multiple specialized hard blocks within a FPGA. In alternative embodiments a single FSM may be split with parts of it implemented in one or more specialized hard blocks and other parts implemented completely within soft logic on the FPGA.

FSM Partitioning

Given an input graph G=(V, E), the objective of bi-partitioning problem is to partition the vertex set V into two disjoint subsets with the main goal of minimizing the number of edges between two subsets. The FSM partitioning (decomposition) problem is a well-known problem with plenty of possible solutions which are mainly proposed to target complex state machines. For the purpose of partitioning HLS-generated FSMs, which are typically less complex in terms of the number of transition between different states, a classic algorithm known as Fiduccia-Mattheyses partitioning algorithm can be utilized (see C. M. Fiduccia and R. M. Mattheyses, "A Linear-Time Heuristic For Improving Network Partitions," *Papers On Twenty Five Years Of Electronic Design Automation*, pages 241-247, ACM, 1988). The Fiduccia-Mattheyses partitioning algorithm is an iterative mincut heuristic algorithm with a linear computation time with respect to the size of the input graph. We have shown that this algorithm works well in a state machines that was generated by HLS tools and we expect that it performs well on other FSMs as well, since they share the same features.

Fracturable FSM Block Architecture

When splitting an FSM over multiple fracturable blocks, every state transition across two different blocks requires control signals that enable switching between these blocks. For example, if the current state X is mapped to the fracturable block A and the next state Y is mapped to the fracturable block B, then when the transition occurs, the state register of block A enters an idle state, and the state register of block B is updated to Y. To enable this switching between the blocks, state X carries the metadata that controls this transition. In some embodiments of the present invention, this metadata is stored in the memory unit. If the states that mark the transition across fracturable blocks are stored in memory, an extra field on each memory row can be used to store the required metadata for transitioning across the blocks. In this example, state X is stored in memory. In the case that a FSM is split over two fracturable blocks, a single bit in memory is sufficient to indicate whether the next state should be calculated in this block or the other fracturable block that implements the same FSM.

By transitioning to another fracturable block, we enter a new state which can either be mapped to the memory unit or accumulator unit. As described above, if this state is mapped to the accumulator unit the control registers, specifically, Path Final State Register, Branch Address Register, and State control Register are updated as well. Extra multiplexer logic can be used to allow setting the value of these registers from multiple sources which are the memory unit on the same block as well as the memory unit on the other fracturable block.

To summarize, for any transition across two fracturable blocks, both current state and next state are stored in memory. Although this increases the required memory size to accommodate the FSM, a proper partitioning algorithm that aims to reduce the number of transitions between blocks can typically limit this memory overhead to only a few extra entries.

Additionally, a multiplexer before the state register in each fracturable block is added to allow updating the state value using the data stored in the other fracturable block, for the scenario where there is a transition between two blocks. The state value zero is dedicated as the idle state. Once the state calculation tasks gets transferred over to the other fracturable block, the inactive block will enter the idle state by updating its state register to zero. The overhead and issues of splitting the FSM over more than two fracturable blocks are discussed below.

State Assignment Algorithm

The state assignment (encoding) problem is defined as determining the binary representation of the states in a finite-state machine such that each state has a unique value to separate it from the other states. The state encoding directly affects the circuit area and performance as different encoding results in different circuit complexity. The choice of circuit implementation, such as two-level logic, multiple-level logic, or in the present case a mix-grained architecture that contains a specialized ASIC-like FSM block, also plays an important role in finding the state encoding that optimizes the circuit area and/or performance. For the purpose of mapping to embodiments of the present invention, the circuit area is measured by the number of bits required for state encoding, the number of states that have to be mapped to the memory unit, and the logic complexity of the input sequence encoder. A novel state assignment technique is utilized for the FSM targeting the specialized FSM block. This technique aims to minimize the FSM area by mapping as many states to the accumulator logic as possible and minimizing the number of states that reside in memory, hence reducing the input encoder logic complexity.

The state assignment algorithm consists of two main parts: (1) identifying the state categories and (2) performing state encoding separately on each state category. Before describing how we categorize the states, we first explain why we need different categories. The specialized FSM block contains two main parts that perform the next state calculation: the memory unit and accumulator unit. Each units is responsible for determining the next state value for a subset of states. A proper state encoding for each subset should consider the limitations and requirements of the unit that is in charge of the next state calculation for this subset. Thus, the states are grouped into two categories based on whether their next state is calculated by the memory unit or accumulator unit. Below, we discuss the requirements of each unit in detail and explain the actions required to meet these requirements. Then we explain how to categorize the states.

Memory Unit Requirements

The main requirements are the memory size and address signal generation. The read address signal of the memory unit is formed by concatenating the value of the current state and encoded input signals that comes from the input sequence encoder. However, only a subset of states of the FSM reside on the memory, hence not all the bits of the current state signal are necessary for addressing the memory. For example, if the number of the states that are stored on memory is equal to n, then only $\log_2 n$ bits of the current state signal are required for addressing the memory. Therefore, the state encoding for these states can be set to between zero and n to minimize the size of memory and allow the least significant bits of the current state to be utilized as inputs to the memory unit. In alternative embodiments, another set of state assignments could be used as long as a subset of bits of the current state are sufficient to uniquely identify the n states.

Accumulator Unit Requirements

As described above, the accumulator unit performs the state calculation for the states that belong to branch-free paths, hence it is necessary for the consecutive states of each path to have consecutive state values. However, there is one and only one state encoding for each individual state, therefore in a scenario where two branch-free paths overlap, such as path A and path B shown in FIG. 16A and FIG. 16B, we first refine the paths such that they do not overlap to avoid two encoding values for the same state.

Path Refinement

On any transition from a memory state to an accumulator state, there is metadata for the corresponding branch-free path that is provided to the accumulator unit. To store this metadata, we use the memory location for a state that transitions to a branch-free state. For any given path, the previous state that branches to this path resides in memory so it can store this metadata. As such, there is a gap of at least one memory state between the vertices of any two branch-free paths. Note that due to the definition of a branch-free path, any two non-overlapping branch-free paths satisfy this requirement, since a branch-free path begins right after and terminates where there is a state with a fan-out degree greater than 1 (divergent vertex), which corresponds to a state stored in memory. Thus, any two non-overlapping paths will be at least one memory state away from each other.

Two branch-free paths can never overlap at the starting vertex since they will be equivalent. However, they can overlap on any other vertex, in which case the remaining vertices will also overlap. Therefore, if two branch-free paths overlap on any of their vertices, they will definitely overlap on the ending vertex as well. The ending vertex is always a predecessor to a divergent vertex. This means that branch-free paths that have different starting vertices but share a common termination divergent vertex, might partially overlap with each other. We use this condition to find the potentially overlapping paths by grouping the paths that share a common termination divergent vertex. In a scenario where the branch-free paths overlap, we refine the paths such that the refined paths are at least one memory state away from each other as described above.

The pseudo code of the path refinement algorithm for an embodiment of the present invention is shown below:

Algorithm 1 Path Refinement

Input: $\mathbb{G} \rightarrow$ set of branch-free paths grouped by common termination node
Output: $\mathbb{G}_{refined} \rightarrow$ Set of refined branch-free paths from $\mathbb{G}$
Output: $\mathbb{I}_G \rightarrow$ Set of independent vertices from $\mathbb{G}$
1:  $\mathbb{S} \rightarrow$ Set of refined path vertices
2:  SPL $\rightarrow$ sorted list of branch-free paths.
3:  $\mathbb{S} = \emptyset$
4:  SPL = sort($\mathbb{G}$);
5:  while SPL! = $\emptyset$ do
6:   LP = select the path with the longest length from SPL;
7:   for all $v_i \in$ LP do
8:    if $v_i \in \mathbb{S}$ then
9:     $LP_{refined}$ = terminate(LP,i − 1);
10:    add $v_{i-1}$ to $\mathbb{I}_G$;
11:    break;
12:   end if
13:  end for
14:  if $LP_{refined}! = \emptyset$ then
15:   add $LP_{refined}$ to $\mathbb{G}_{refined}$
16:   add all the vertices of $LP_{refined}$ to $\mathbb{S}$
17:  end if
18: end while The input to the algorithm is a set of branch-free paths which share a common termination vertex. This means that the ending node of all paths in this set is a predecessor to a common divergent vertex (a vertex with fan-out degree greater than one). Note that due to the definition of a branch-free path, paths that do not share a common termination node will never overlap, hence this is a required condition that indicates the potential of overlapping. After applying the path refinement algorithm, the output is (1) a set of refined branch-free paths and (2) a set of independent vertices which, contains the states that initially belong to overlapping branch-free paths, but are no longer part of the refined paths after applying refinement. The path refinement algorithm is used as an intermediate step by the state assignment algorithm, discussed below. We start by describing the details of the path refinement algorithm and then use an example to better illustrate these steps.

Step 1: At the initial step, set $\mathbb{S}$, which will eventually contain all vertices that belong to the refined branch-free paths is empty. This set is used to keep track of the vertices that belong to the refined branch-free paths over different iterations of this algorithm to help detect the overlaps. Second, we sort the paths that belong to the input set $\mathbb{G}$ based on their path length and then add them to SPL, a sorted list of all paths from $\mathbb{G}$ (lines 3-4).

Step 2: At this step, as long as SPL is not empty, we select the longest path LP from SPL to apply the path refinement process on it (lines 5-6).

Step 3: Next we traverse LP and compare each of its vertices with every vertex of $\mathbb{S}$, until we find a common vertex between LP and $\mathbb{S}$ or we reach the end of path LP (lines 7-13). Note that when we first start the algorithm, set $\mathbb{S}$ is empty, thus none of the vertices of LP will overlap with the vertices of set $\mathbb{S}$ for the first path.

Step 4: After we detect two overlapping vertices at $v_i$, we terminate LP at $v_{i-1}$. This requires cutting LP such that the predecessor of $v_{i-1}$, $v_{i-2}$, is the ending vertex of the refined path. By doing so, $LP_{refined}$ no longer overlaps with any of the paths that have already been refined. Vertex $v_{i-1}$ will now become an independent state and be added to the set of independent states $\mathbb{I}_G$ which will be stored in memory. This independent state, $v_{i-1}$, separates $LP_{refined}$ from all others refined paths (lines 9-10).

Step 5: Next, we add the refined path, $LP_{refined}$, to the set of refined paths $\mathbb{G}_{refined}$ and add all of its vertices to the set of refined path vertices $\mathbb{S}$ (lines 15-16) to be used for the next iterations of the while loop (line 5).

Step 6: Once the while loop is completed, $\mathbb{G}_{refined}$ will contain the set of refined branch-free paths and $\mathbb{I}_G$ will include the independent states.

Figure 16B:
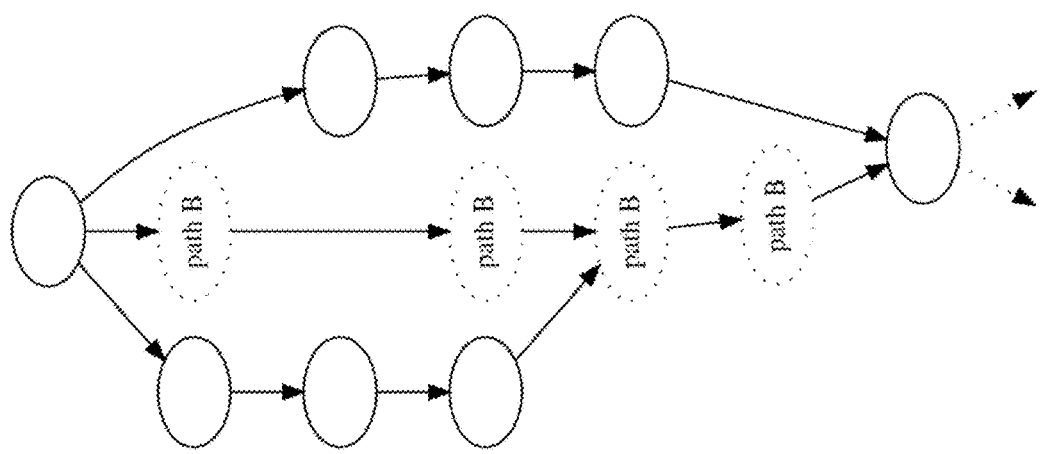
FIG. 16B illustrates path B in a path refinement operation.
Figure 16A:
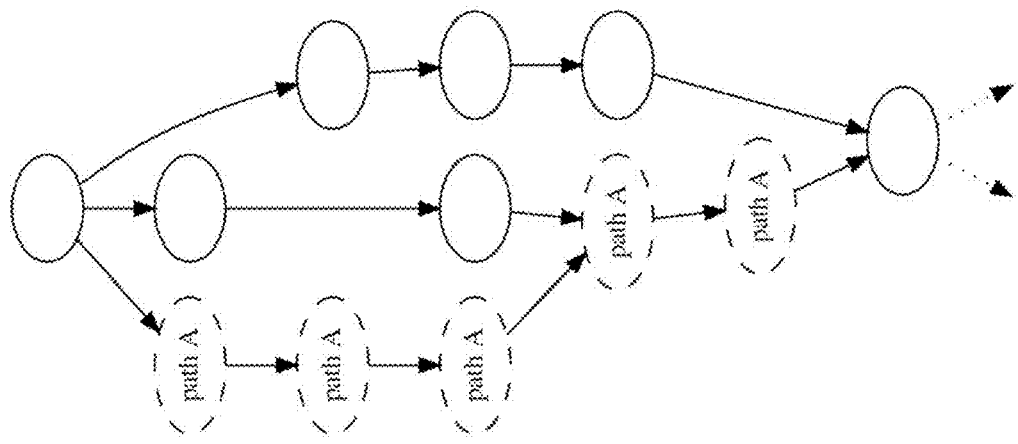
FIG. 16A illustrates path A in a path refinement operation.
Figure 15:
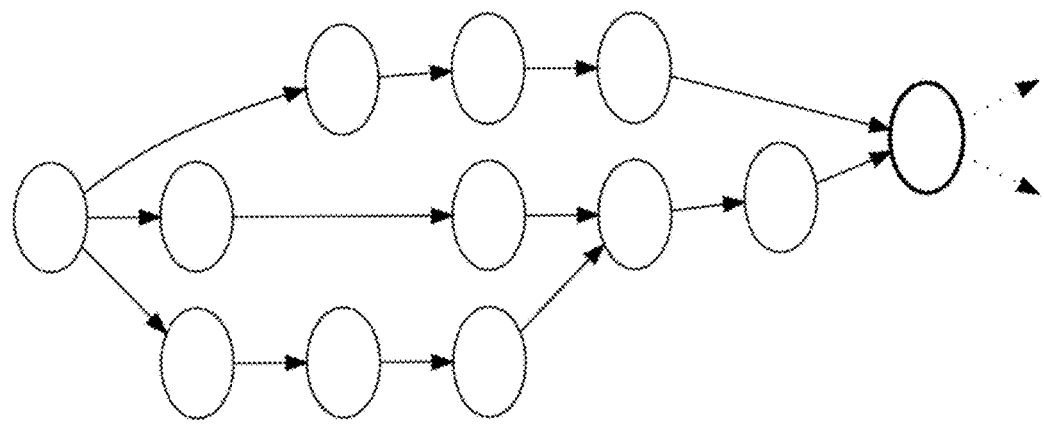
FIG. 15 illustrates a state diagram in a path refinement operation.
Figure 16C:
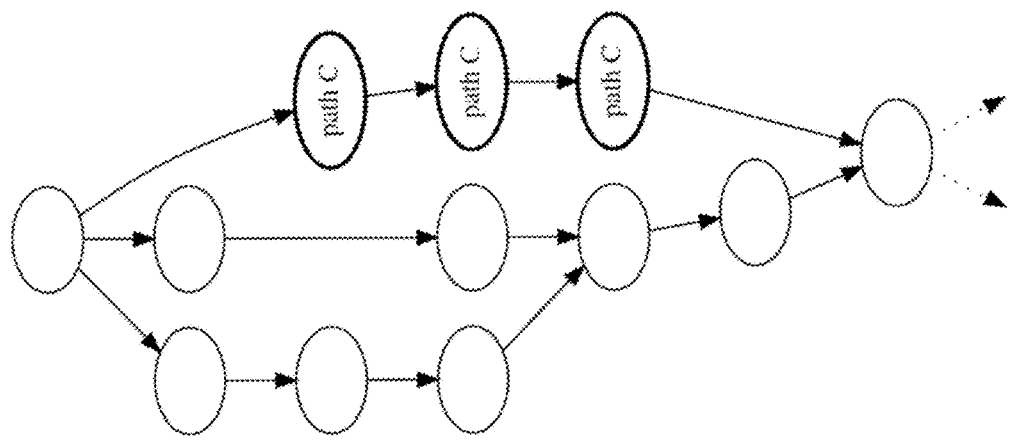
FIG. 16C illustrates path C in a path refinement operation.
Figure 20:
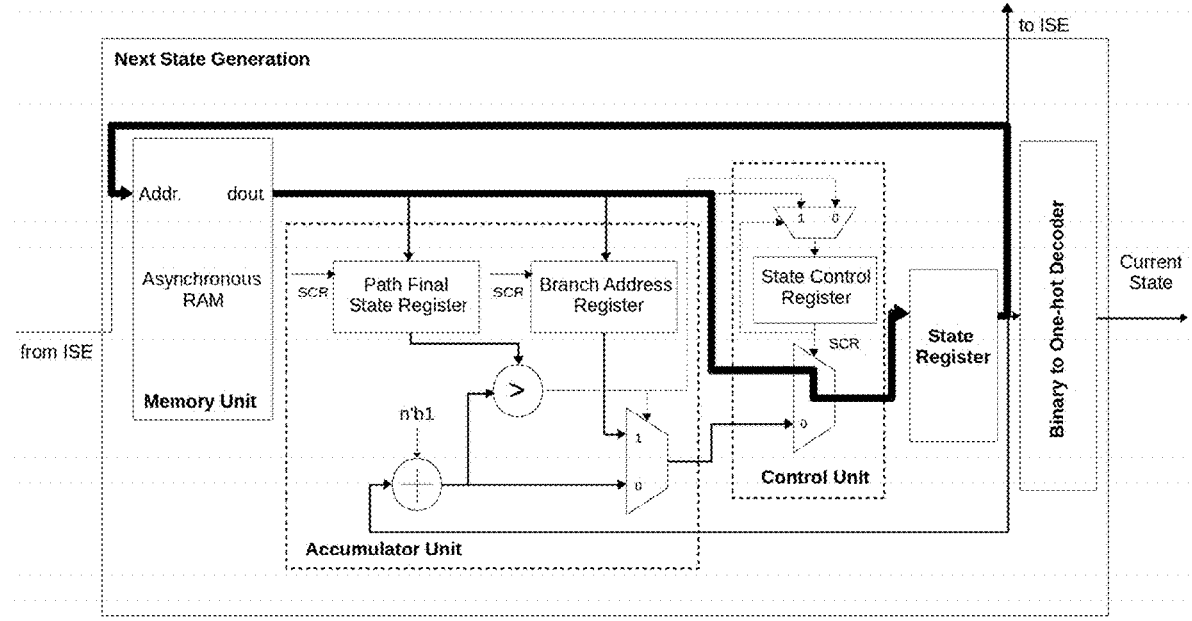
FIG. 20 illustrates a transition from a memory state to a memory state.
Figure 21:
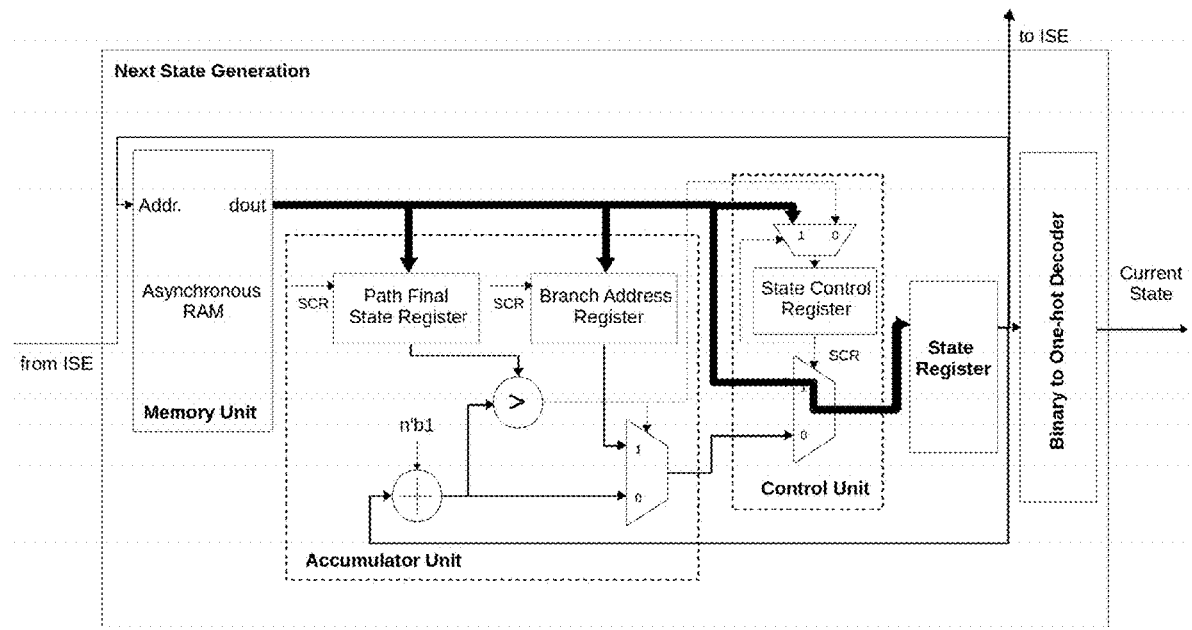
FIG. 21 illustrates a transition from a memory state to a branch-free path state.
Figure 22:
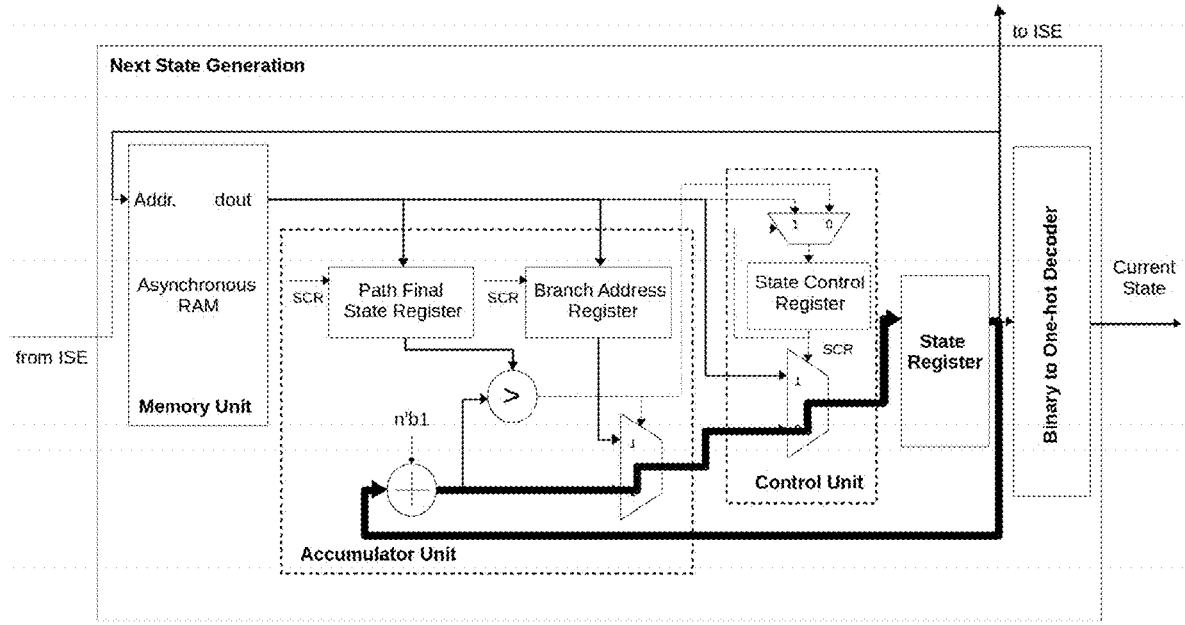
FIG. 22 illustrates a transition from a state of a branch-free path to another state on the same path.
Figure 23:
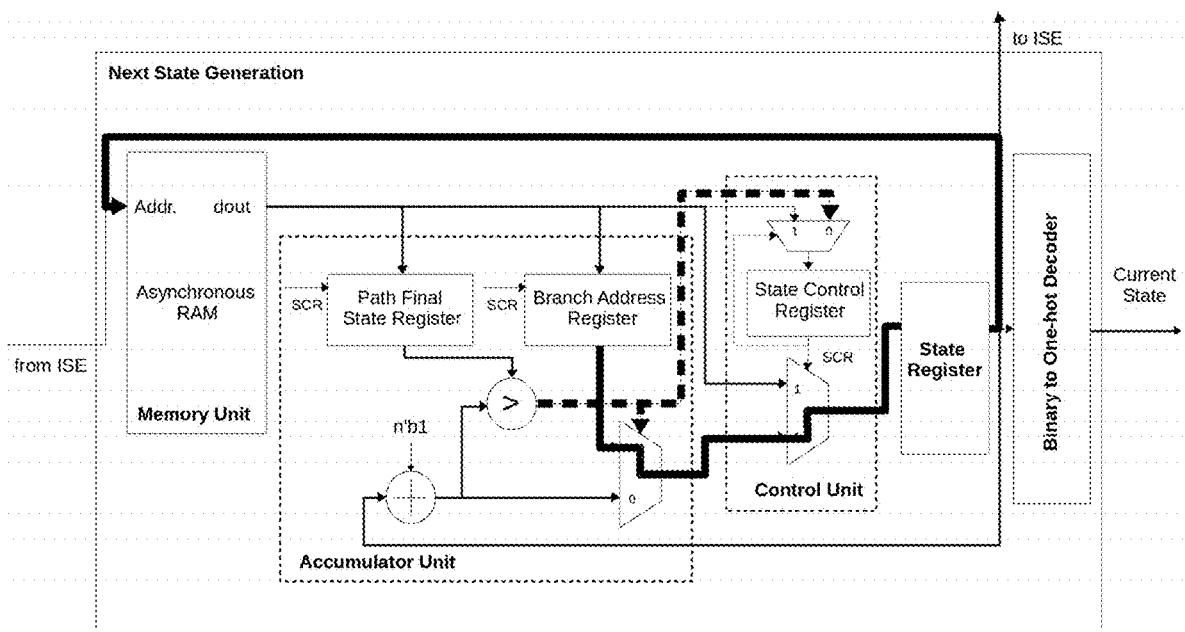
FIG. 23 illustrates a transition from the last state of a branch-free path to a memory state.

An example of a scenario when two branch-free paths of a state transition graph overlap is illustrated in FIGS. 15, 16A, 16B, 16C and 17. FIG. 15 shows part of the state transition graph of an FSM (labels are omitted for simplicity), which contains three branch-free paths. FIGS. 16A, 16B and 16C highlight these paths individually. These three paths all share a common termination node (shown in bold in FIG. 15), thus they might overlap. In this case, the last two states of path A and path B overlap, therefore the path refinement algorithm is applied on these paths. An example used to illustrate this algorithm is described below.

Figure 17:
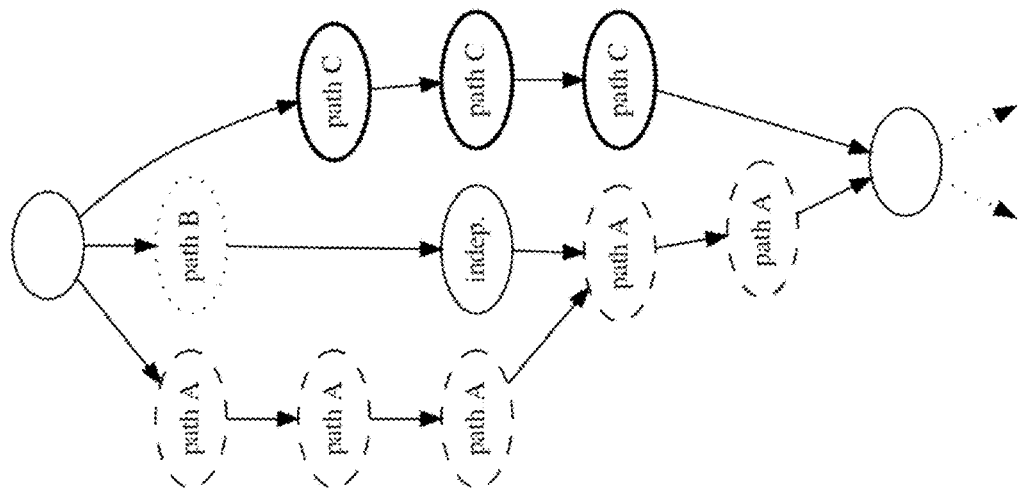
FIG. 17 illustrates the refined paths in a path refinement operation.

In this example, the input to the algorithm is a set of branch-free paths that contains path A, path B, and path C which all share a common termination node (shown in bold in FIG. 15). At step 1, these paths are sorted based on their path length in the following order, path A (5 vertices), path B (4 vertices), and path C (3 vertices). At the first iteration of the algorithm, path A will be selected. However, as the set of refined path vertices $\mathbb{S}$ is empty, path A do not require refinement and will be added to the set of refined paths $\mathbb{G}_{refined}$ as is. All of its vertices will then be added to the set of refined path vertices $\mathbb{S}$ (step 2 through 5). At the second iteration, path B will be selected. By comparing each of its vertices with the vertices of set $\mathbb{S}$, which now contains all the vertices of path A, we find that the third vertex of path B already exist in set $\mathbb{S}$. Therefore, we terminate path B at its second vertex by cutting it after its first vertex. This means that one independent memory state, the second vertex of path B, will be used before overlapping with path A to store the necessary metadata to join path A. FIG. 17 illustrates the effect of the terminate subroutine applied to path B from FIG. 16B. After applying terminate to the middle path, the refined path B now only has one state. The one state gap that separates path A from the refined path B is labelled "indep." (independent) state. At the third iteration of the algorithm path C, the only remaining path, will be selected. Since none of the vertices of path C overlap with any of the refined paths, it will be added to the set of refined paths $\mathbb{G}_{refined}$ as is. At this point the algorithm is completed and the output is (1) the set of refined paths A, B, and C (shown in FIG. 17), and (2) a set of independent states which contains the vertex labeled "indep.".

In an alternative embodiment of the path refinement algorithm, overlap of branch-free paths is eliminated by using state replication, which involves replicating a state such that we have two states with different state encodings but with the same outputs. For example, in the example shown in FIGS. 16A and 16B, the last two states of path B could be replicated creating two additional states such that path A and path B would no longer overlap. This would eliminate the need for labeling the second state in path B as an independent state. State replication will result in fewer independent states (and thus fewer states handled by the memory unit) at a cost of duplicated branch-free states with different state encodings. This comes with two main overheads: 1) potentially more bits for state encoding due to the increase in the total number of states caused by replicated states 2) additional output generation logic due to additional states (duplicated states have the same output, but they have different state encoding, hence output generation logic needs to handle this).

State Assignment

Pseudocode for which is shown below:

Algorithm 2 State Assignment

Input: $G_{fsm}$ = (V,E) → FSM state transition graph
Output: $G_{encoded-fsm}$ = (V,E) → Encoded FSM state transition graph where each vertex is labelled by its state encoding value
 1: $\mathbb{P}_{non-refined}$ → Set of non-refined branch-free paths
 2: $\mathbb{P}_{refined}$ → Set of refined branch-free paths
 3: $\mathbb{P}_{k-non-refined}$ → Set of non-refined branch-free paths that share common terminating divergent vertex $d_k$ ($\mathbb{P}_{k-non-refined}$ ⊂ $\mathbb{P}_{non-refined}$)
 4: $\mathbb{P}_{k-refined}$ → Set of refined branch-free paths after applying refinement algorithm on $\mathbb{P}_{k-non-refined}$ ($\mathbb{P}_{k-refined}$ ⊂ $\mathbb{P}_{refined}$)
 5: $\mathbb{I}$ → Set of independent vertices
 6: $\mathbb{I}_k$ → Set of independent vertices found after applying path refinement algorithm on $\mathbb{P}_{k-non-refined}$
 7: $\mathbb{D}$ → Set of divergent vertices
 8: $\mathbb{S}_j$ → Set of successors of divergent vertex $d_j$
 9: /*find all divergent vertices in the state transition graph*/
10: traverse $G_{fsm}$ and populate $\mathbb{D}$ with the vertices that have fan-out greater than 1
11: /*find all branch free paths in the state transition graph*/
12: for all $d_j \in \mathbb{D}$ do
13:   for all $s_j \in \mathbb{S}_j$ do
14.:     add the branch-free path $p_j$ that starts from $s_j$ to $\mathbb{P}_{non-refined}$
15.:   end for
16:  end for
17: /*group together the branch-free paths that share common terminating divergrent vertex*/
18: for all $d_k \in \mathbb{D}$ do
19:   add every branch-free path from $\mathbb{P}_{non-refined}$ that share common terminating vertex $d_k$ to $\mathbb{P}_{k-non-refined}$
20: end for
21: /*Apply the path refinement algorithim (Algorithm 1)*/
22: for all $d_k \in \mathbb{D}$ do
23:   ($\mathbb{P}_{k-refined}$, $\mathbb{I}_k$) = path refinement ($\mathbb{P}_{k-non-refined}$) /* Algorithm 1*/
24:   $\mathbb{P}_{refined}$ = $\mathbb{P}_{refined} \cup \mathbb{P}_{k-refined}$
25:   $\mathbb{I}$ = $\mathbb{I} \cup \mathbb{I}_k$
26: end for
27: $\mathbb{I}$ = $\mathbb{I} \cup \mathbb{D}$
28: /*state assignment*/
29: for all $v_i \in \mathbb{I}$ do
30:   assign a state encoding in an incrementing manner starting from zero
31: end for
32: for all $P_i \in \mathbb{P}_{refined}$ do
33:   for all $v_j \in P_i$ do
34:     assign a state encoding in an incrementing manner starting from the last value that was used for the previous path +1
35:   end for
36: end for As mentioned above, the state assignment algorithm consists of two main parts: (1) identifying the state categories and (2) performing state encoding separately on each state category. These state categories are described below:

branch-free states: States that belong to non-overlapping branch-free paths.

independent states: All remaining states that either have a fan-out degree greater than one (divergent states), or states that are initially part of the overlapping branch-free paths but do not qualify to remain part of the path after applying path refinement.

Below we describe the details of the state assignment algorithm:

Step 1 (Identify divergent vertices): Identify and add vertices with a fan-out degree greater than one (two or more successors) to the set of divergent vertices $\mathbb{D}$ (lines 9-10).

Step 2 (Identify branch-free paths): Find all of the branch-free paths between every two divergent vertices that have been marked in the first step and add them to the set of non-refined branch-free paths $\mathbb{P}_{non-refined}$ (lines 11-16). To identify a branch-free path, we start from a successor of a divergent vertex and add its consecutive vertices to the path by traversing the graph before arriving at another divergent vertex. By doing so, all the vertices on this path will only have a fan-out degree of one, hence the corresponding path meets the requirements of a branch-free path.

Step 3 (Group the paths based on their termination vertex): At this step, the branch-free paths that share a common termination divergent vertex $d_k$ will be grouped together and added to $\mathbb{P}_{k-non-refined}$ since this is a precondition for potential overlapping paths (lines 17-20).

Step 4 (Apply path refinement): Apply the path refinement algorithm on each group of branch-free paths with a common termination vertex that were obtained in step 3, $\mathbb{P}_{k-non-refined}$ (line 23). The output of this step is the subset of refined branch-free paths, $\mathbb{P}_{k-refined}$, and the subset of independent states, $\mathbb{I}_k$, that are no longer part of the refined paths (described above).

Step 5 (Update state categories-1): Add the subset of paths that were refined in step 4, $\mathbb{P}_{k-refined}$, to the final set of refined branch-free paths, $\mathbb{P}_{refined}$ (line 24). Update the set of independent vertices $\mathbb{I}$ by adding the vertices that were obtained in step 4, $\mathbb{I}_k$, to this set (line 25).

Step 6 (Update state categories-2): Add the divergent vertices, $\mathbb{D}$, to the list of independent vertices $\mathbb{I}$. Set $\mathbb{I}$ indicates all of the vertices (states) that will be mapped to the memory unit (line 27).

Step 7 (State assignment-1): Finally, for the independent vertices, $\mathbb{I}$, that were identified in step 1 through step 6, assign incremental values to the vertices (states) starting from zero (lines 29-31).

Step 8 (State assignment-2): For each branch-free path in the refined path set $\mathbb{P}_{refined}$, assign incremental values to the consecutive vertices (states). For the first path, the starting state value will be the value assigned to the last independent state (step 7) plus one. For all remaining paths, the starting state value is one greater than the last state value of the previous path (lines 32-36).

Mapping to the Specialized FSM Architecture

The mapping process consists of three main steps: Applying the size checking pass, Fine-grained mapping, and Coarse-grained mapping.

Applying the Size Checking Pass

At this step we check two required conditions to verify whether the input FSM, described by its state transition table, is suitable to be mapped to the next state generation block: (1) Whether the number of bits required for the encoding of the state machine is smaller than the maximum bit-width of the adder unit, (2) if the total number of states that reside in memory are smaller than the size of the memory unit. This step is performed after applying the state assignment algorithm described above. A more detailed description of this step is described below.

Fine-Grained Mapping

This part corresponds to mapping the corresponding part of the FSM to the input sequence encoder. To do so, we form the logic function that implements the input sequence encoder. This is achieved by performing a transformation on the state transition table. The goal of this transformation is to reduce the number of inputs to what we call the encoded input sequence. This is shown with an example in the tables below.

The original state transition table of an example FSM:

| Input | Current state (cs) | Next state (ns) |
|---|---|---|
| 10'bx | s0 | s1 |
| 10'bx | s1 | s2 |
| 10'bx | s2 | s3 |
| 10'bxxx11xxx0x | s3 | s17 |
| 10'bxxx11xxx1x | | s4 |
| 10'bx | s4 | s5 |
| 10'bx | s5 | s6 |
| 10'bx | s6 | s7 |
| 10'bx | s7 | s8 |
| 10'bx | s8 | s9 |
| 10'bx | s9 | s10 |
| 10'bx11xxx1xxx | s10 | s11 |
| 10'b101xxx11xx | | s3 |
| 10'bx11xxx1xx0 | | s17 |
| 10'bx | s11 | s12 |
| 10'bx | s12 | s13 |
| 10'bx | s13 | s14 |
| 10'bx | s14 | s15 |
| 10'bx | s15 | s16 |
| 10'bx | s16 | s17 |
| 10'bx | s17 | s0 |

This table shows the choice of next state value for a given state based on the current state and input value. This FSM has 10 inputs, however, each state has no more than 3 next states. Therefore, an encoded input sequence with only 2 bits is sufficient to distinguish among the next states of any given current state. To obtain such encoded input sequence, we first transform the original state transitions table to a reduced table which only contains the states that have more than one next state. The reduced table is shown below:

| Original Input | Current state (cs) | Next state (ns) |
|---|---|---|
| 10'bxxx11xxx0x | s3 | 2b00 |
| 10'bxxx11xxx1x | | 2b01 |
| 10'bx11xxx1xxx | s10 | 2b00 |
| 10'b101xxx11xx | | 2b01 |
| 10'bx11xxx1xx0 | | 2b10 |

The reduced table is then used as a truth table to implement a logic function that takes the state machine input as input and generates an encoded input sequence as output.

Coarse-Grained Mapping

The next step, coarse-grained mapping, generates the memory contents for the FSM. At this point, the state assignment algorithm has been applied to the state machine. Hence the states that reside in memory, and their corresponding metadata have been determined. Using this information, the memory contents are generated in the format as described above.

Complete Example

Now we will present a complete example from C code to implementation and operation of the corresponding FSM in an embodiment of the present invention and illustrate different sources of branch-free paths in HLS generated benchmarks.

Generating the FSM

Shown below is a simple micro-benchmark with a function, foo, that contains conditional code (line 6), a loop (line 11), data-dependent instructions (lines 7-9 and 12-16), and instructions with different latencies (e.g., divide on line 12 and shift on line 14):

```
1.     int foo(int A, int B, int C, int N)
2.     {
3.         int x, y, z, result;
4.
5.         x = y = z = result = 0;
6.         if (B > A) {
7.             int tmp = B;
8.             B = A;
9.             A = tmp;
10.        }
11.        while ( (N-31 > 0) && (0 < A) ) {
12.            x = A / B;
13.            A = x;
14.            y = x << C;
15.            z = y + x;
16.            result += z;
17.        }
18.
19.        return result;
20.    }
```

The example shows a while loop with four consecutive instructions each with a data dependency on the previous instruction. Additionally each instruction performs an operation that may have a different latency in hardware such as division, multiply, shift and add.

FIG. 18A presents the FSM generated by Vivado HLS as part of the generated RTL design for the C function shown above.

In this example, state S0 is the initial state, which waits for a start signal before transitioning to S1. State S0 and S1 correspond to the initialization code (line 5) and swap code (lines 6-10). While there is a conditional branch at line 6, the code is easily mapped to a multiplexer in hardware, so there is no corresponding branch node in the state graph. States S2-S40 correspond to the while loop (lines 11-17). (Note that the loop condition, (0<A), was added so the loop would not be simplified by Vivado.) State S3 evaluates the loop condition and returns to S0 if the loop is complete, or transitions to S4 if not. The long branch-free path from S4-S2 (37 states) corresponds to the loop body (lines 12-16) and is a result of the data dependence between instructions (e.g., lines 14 and 15) and the latency of the instructions. For example, if the divide operation at line 12 is replaced with a multiply operation, the length of the path changes relative to the difference in latency between the two operations.

State Assignment

The state transition graph of the example shown in FIG. 18A is used as input to the state assignment algorithm, which first categorizes the states and then perform the state encoding on each category separately.

Categorizing states: In step 1 of the state assignment algorithm, S0 and S3, the states with more than one next state, are added to the set of divergent states. These states are shown in bold in FIG. 18A. In step 2 of the state assignment algorithm, we find all the branch-free paths that start from successors of S0 and S3. This step results in finding path1=<S1, S2> (illustrated in bold in FIG. 18B) and path2=<S4, S5, S6, . . . , S39, S40, S2> (illustrated in bold in FIG. 18C).

In steps 3 and 4 of the state assignment algorithm, overlapping paths are identified and the path refinement algorithm is applied. In this example, the two branch-free paths overlap at S2, which requires path refinement. After applying the path refinement algorithm, the longer path, path2, remains the same while path1 will no longer exist since S1 becomes the independent state that separate these two paths. S1 stores metadata to support the case that the FSM transitions to path2 via S1 to S2.

After the above steps, the only branch free states are the states of path2. The remaining states, along with the divergent states, are marked as independent states (illustrated in bold in FIG. 19). This corresponds to steps 5 and 6 of the state assignment algorithm.

Now that we have categorized the states, we can perform state assignment on each category according to steps 7 and 8 of the state assignment algorithm. The result of state assignment is shown in FIG. 19.

Memory Unit Content

To simplify this example, we assume that the memory unit is sized exactly to fit this FSM, which has a depth of 6 entries and a width of 15-bits. Note that Next State and Path Final State fields are 6 bits since we require 6 bits to encode all of the states (floor($\log_2$(40 states))=6), however, the Branch Address field is only 2 bits since there are only 3 states that reside in memory, hence we only require 2 bits to distinguish among these 3 states.

The memory contents for this example is shown in the table below:

| | Address | Memory Content | | | |
|---|---|---|---|---|---|
| State | {CS, Encoded input} | Next State | Final State | Target | Mem/add |
| S0 | {00,0} | 6'd0 | x | x | 1 |
|  | {00,1} | 6'd2 | x | x | 1 |
| S1 | {10,0} | 6'd40 | 6'd40 | 2'd1 | 0 |
|  | {10,1} | x | x | x | x |
| S3 | {01,0} | 6'd3 | 6'd40 | 2'd1 | 0 |
|  | {01,1} | 6'd0 | x | x | 1 |

The first two columns, state label and address, are not part of the memory but have been added to the table to help with understanding which entry corresponds to which address and state. Note that the state encoding shown corresponds to that generated by the state assignment algorithm and corresponds to the state values shown in FIG. 19. As such, the state encodings may be different from the state label (e.g., S0=6'd0, S1=6'd2, and S3=6'd1). Since the fan-out degree of the states in this example is at most 2, each state will have two corresponding rows in memory, which only requires 1 bit for the Encoded input to select the next state. Each memory location containing an x indicates that the content of the corresponding field is unused for this state (memory row). This occurs for the state transitions where both current state and next state reside in memory, since the Path Final State and Branch Address entries are only used for the states that belong to branch-free paths. As mentioned earlier, independent states (including divergent states) reside in memory, so any transition between two independent states contains unused memory fields.

Specialized FSM Block Operation

There are four possible operating conditions: transitioning from a memory state to a memory state, from a memory state to a branch-free state, from a branch-free state to a branch-free state on the same path, and from a branch-free state to a memory state. Each of these cases is described below and FIGS. 20, 21 22 and 23 highlight the relevant active portions of the specialized FSM block.

Memory state to memory state transition (e.g., S0 to S1 in FIG. 19): In this case, illustrated in FIG. 20, the FSM block behaves simply like a memory-only FSM implementation. The current state (S0) and encoded input are used to address the memory unit, and the next state (S1) is read from memory. Using the State Control bit from memory, the control unit selects the next state output from the memory to write to the state register. Aside from the State Control bit, the corresponding metadata in the memory is unused.

Memory state to branch-free path state (e.g. S3 to S4 in FIG. 19): In this case, illustrated in FIG. 21, the control registers, specifically, the Path Final State Register and Branch Address Register, are updated to control the branch-free path state generation for subsequent cycles. The next-state (i.e., the start of the branch-free path, S4) is loaded into the state registers and the metadata, as described above, is loaded into the Path Final State (S2) and Branch Address (S3) registers.

Branch-free path state to Branch-free path state on the same path (e.g., S39 to S40 in FIG. 19): In this case, illustrated in FIG. 22, the adder in the accumulator unit is used to increment the current state (S39 with encoding 6'd38) to the next state (S40 with encoding 6'd39). The comparator compares the next state with the final state of the path in the Path Final Register (S2 with encoding 6'd40). Since the value of the adder 6'd39 (S40) is not greater than 6'd40 (S2), the accumulator unit and control unit pass the next state (S40) to the state registers.

Branch-free path state to Memory state (e.g., S2 to S3 in FIG. 19): Finally in this case, illustrated in FIG. 23, the adder unit increments the current state (S2 with encoding 6'd40) and the comparator compares the value of the next state from the adder (6'd41) with the value in the Path Final State Register (S2 with encoding 6'd40). Since the value of the adder is greater than the Path Final State Register, the comparator sets the control signal to select the value in the Branch Address Register (S3 with encoding 6'd1) to send to the state registers. This transitions out of the branch-free path as the next state is used to address the memory unit.

While not a separate case, the transition from S1 to S2 transitions from a memory state to branch-free path state that is not the initial state on the path. This behaves identically to the memory state to branch-free path state transition described above, with the only difference being the initial state that is loaded into the state registers.

Experimental Methodology

Benchmarks

Two sets of C/C++ benchmarks were used to evaluate embodiments of the present invention. Both benchmark sets have been developed to be used by HLS tools. The first benchmark set, *MachSuite* (see B. Reagen, R. Adolf, Y. S. Shao, G.-Y. Wei, and D. Brooks, "MachSuite: Benchmarks for Accelerator Design and Customized Architectures," 2014 *IEEE International Symposium on Workload Characterization (HSWC)*, pages 110-119), is a collection of benchmarks for evaluating accelerator design and customized architectures. The second benchmark sets, HLS datacenter benchmark, was developed in the computer architecture group at the Electrical and Computer Engineering Department at the University of British Columbia (see R. David Evans, *Architecture Synthesis from High-Level Specifications*). The HLS datacenter benchmark set consists of high impact functions, in terms of run time, extracted from Lucy (see Apache Software Foundation, *LuCy*, http://lucy.apache.org/), SQLite (see Hwaci, *SQLite*, https://www.sqlite.org), and BZIP (see SPEC, *CPU* 2006, https://www.spec.org/cpu2006/) benchmarks, and aims to represent benchmarks that may be commonly run in a datacenter. Some parts of these benchmarks were re-written to replace C/C++ features that are not supported by Vivado HLS.

The tables below show the number of lines of C/C++ code, excluding comments, for the benchmarks in each benchmark set. This is used to highlight the size and complexity of the benchmarks to better understand the resulting FSMs from HLS.

MachSuite Benchmarks:

| Benchmark | Lines of code |
| --- | --- |
| backprop | 159 |
| aes | 167 |
| viterbi | 44 |
| spmv_crs | 34 |
| spmv_ellpack | 34 |
| nw | 98 |
| bfs_bulk | 64 |
| bfs_queue | 71 |
| fft_transpose | 363 |
| fftstrided | 43 |
| sort_merge | 57 |
| sort_radix | 116 |
| kmp | 52 |
| stencil3d | 46 |
| stencil2d | 39 |
| md_knn | 71 |
| md_grid | 78 |
| gemm_ncubed | 41 |
| gemm_blocked | 43 |

HLS Datacenter Benchmarks:

| Benchmark | Lines of code |
| --- | --- |
| bzip | 747 |
| lucy_sn | 78 |
| lucy_sv | 82 |
| lucy_sa | 66 |
| sqlite_ln | 561 |
| sqlite_gt | 410 |

The benchmarks were converted from C/C++ to Verilog HDL using Vivado HLS. The default HLS directives provided in MachSuite were utilized in most cases to improve the quality of the generated Verilog code. However, the default HLS directives might not necessarily lead to the most optimized design. In order to directly evaluate the impact of HLS optimization for certain optimization goals (such as area, delay, and area-delay product) on the generated FSMs, we also used the model described in Lo et al. (see C. Lo and P. Chow, "Model-Based Optimization of High Level Synthesis Directives," 26*th International Conference on Field Programmable Logic and Applications (FPL)*, 2016). Lo et al. used sequential model-based optimization methods to automatically select the set of HLS directives that optimize the design for different optimization goals. We used the data provided by Lo et al. to obtain the HLS directive settings that minimize the area-delay product of the generated RTL design for the aes, backprop and sort radix benchmarks. The result of this analysis is discussed below.

FSM Extraction

To evaluate embodiments of the present invention, the finite state machines from each benchmark were extracted. This was achieved as follows: We used the Yosys synthesis tool (see C. Wolf, *Yosys Open Synthesis Suite*, 2015) to synthesize each benchmark to an RTL netlist. We then used the FSM detection and FSM extraction passes provided in Yosys to detect and extract the state machines from the rest of the design. These passes implement an algorithm similar to the algorithm proposed in Y. Shi, C. W. Ting, B.-H. Gwee, and Y. Ren, "A Highly Efficient Method for Extracting FSMs from Flattened Gate-Level Netlist," *Proceedings of 2010 IEEE International Symposium on Circuits and Systems (ISCAS)*, to extract the FSM from a flatten netlist. The extracted FSM is in KISS format (see E. M. Sentovich, K. J. Singh, L. Lavagno, C. Moon, R. Murgai, A. Saldanha, H. Savoj, P. R. Stephan, R. K. Brayton, and A. Sangiovanni-Vincentelli, *SIS: A System For Sequential Circuit Synthesis*, 1992), a simple format to store the FSM transition table. We have developed an FSM generator in C++ which, given a finite-state machine described in KISS format, generates the Verilog HDL code that describes this FSM. We were interested in the RTL code of the next state calculation logic, hence our FSM generator only generates the RTL design for the next state calculation logic and does not include the output calculation logic in the generated design. Using this flow we are able to extract the FSM from any given benchmark and generate a stand-alone RTL design that describes this state machine.

The statistics of the FSM that we have extracted from the MachSuite and HLS datacenter benchmarks are shown in the tables below.

Characteristics of the FSMs Extracted from MachSuite Benchmarks:

| Benchmark | States | Inputs | Max Fanout |
|---|---|---|---|
| aes_fsm1 | 47 | 6 | 2 |
| aes_fsm2 | 76 | 14 | 2 |
| bckp_fsm1 | 11 | 11 | 2 |
| bckp_fsm2 | 158 | 10 | 2 |
| bckp_fsm3 | 69 | 6 | 2 |
| bfs_b_fsm | 8 | 7 | 3 |
| bfs_q_fsm | 8 | 6 | 2 |
| fft_st_fsm | 24 | 5 | 2 |
| fft_tr_fsm1 | 17 | 8 | 2 |
| fft_tr_fsm2 | 24 | 6 | 2 |
| fft_tr_fsm3 | 219 | 14 | 2 |
| fft_tr_fsm4 | 10 | 6 | 2 |
| fft_tr_fsm5 | 66 | 5 | 2 |
| gemm_fsm1 | 10 | 8 | 2 |
| kmp_fsm1 | 7 | 4 | 2 |
| kmp_fsm2 | 10 | 6 | 2 |
| md_gr_fsm | 15 | 10 | 2 |
| md_knn_fsm | 98 | 5 | 2 |
| sort_m_fsm1 | 4 | 5 | 2 |
| sort_m_fsm2 | 7 | 5 | 2 |
| sort_r_fsm1 | 15 | 11 | 2 |
| sort_r_fsm2 | 6 | 4 | 2 |
| sort_r_fsm3 | 6 | 4 | 2 |
| spmv_crs_fsm | 10 | 6 | 2 |
| smpv_elpk_fsm | 9 | 6 | 2 |
| stencil_fsm | 4 | 4 | 2 |
| viterbi fsm | 8 | 6 | 2 |

Characteristics of the FSMs Extracted from HLS Datacenter Benchmarks:

| Benchmark | States | Inputs | Max Fanout |
|---|---|---|---|
| lucy_sh_fsm | 71 | 3 | 2 |
| sql_ln_fsm_1 | 508 | 56 | 4 |
| sql_ln_fsm2 | 7 | 6 | 3 |
| sql_ln_fsm3 | 5 | 6 | 3 |
| sql_ln_fsm4 | 10 | 10 | 3 |
| sql_ln_fsm5 | 4 | 4 | 2 |
| sql_ln_fsm6 | 4 | 4 | 2 |
| lucy_sn_fsm | 25 | 5 | 2 |
| lucy_sv_fsm | 12 | 10 | 4 |
| bzip_fsm1 | 72 | 19 | 3 |
| bzip_fsm2 | 41 | 11 | 2 |
| bzip_fsm3 | 67 | 28 | 4 |
| bzip_fsm4 | 17 | 9 | 3 |
| bzip_fsm5 | 43 | 4 | 2 |
| bzip_fsm6 | 61 | 19 | 3 |
| bzip_fsm7 | 36 | 13 | 2 |
| bzip_fsm8 | 117 | 34 | 3 |
| sql_gt_fsm1 | 61 | 48 | 4 |
| sql_gt_fsm2 | 12 | 9 | 2 |

Area and Delay Model

Next State Generation Block Area Model

To model the next state generation block, which correspond to the coarse-grained part of the FSM architecture of FIG. 13, we have described the architecture of this block in Verilog HDL. This excludes the area model used for the Input Sequence Encoder which is described below. The memory unit is modelled using the ARM Artisan synchronous SRAM compiler. As described above, the Memory Unit in FIG. 14 is preferably an asynchronous memory in some embodiments of the present invention. A synchronous memory unit was used to model the area. While the area of an asynchronous memory would be comparable to a synchronous memory unit, a small error in the area estimation will have a minimal effect on the total area of embodiments of the present invention since the Next state generation block counts for less than half of the block area for small FSMs, and is much less than half for larger FSMs.

The RTL design was synthesized using the Synopsis Design Compiler vH-2013.03-SP5-2 with the TSMC 65 nm library. The area estimations presented in this dissertation are pre place-and-route. We estimate the routing area of the next state generation block, which is not calculated by the Synopsys design compiler as follows: We exclude the area of the RAM (since the internal routing has already been modelled by the SRAM compiler), then we multiply the area of the remaining units, which is reported by design compiler, by a factor of 2x. Note that by using this approach, we are overestimating the area of the block, since the routing inside the next state generation unit is very limited. Thus, the presented area estimations are conservative.

Input Sequence Encoder Area Model

We have developed an input sequence encoder generator in C++. It takes the FSM described in KISS format and generates the Verilog HDL that implements this encoder, as described above.

The RTL design for the input sequence encoder is then implemented onto the FPGA soft logic. We use the FPGA architecture k6_frac_N10_40 nm provided in VTR (see J. Luu, J. Goeders, M. Wainberg, A. Somerville, T. Yu, K. Nasartschuk, M. Nasr, S. Wang, T. Liu, N. Ahmed, et al, "VTR 7.0: Next Generation Architecture And Cad System For FPGAs," *ACM Transactions on Reconfigurable Technology and Systems (TRETS)*, 7(2):6, 2014) to model the area of the input sequence encoder, and map the input sequence encoder described in Verilog to the FPGA soft logic. We then use the following formula, which is also used by VTR, to convert the logic and routing area reported by VTR in Minimum Width Transistor Area (MWTA) to um$^2$:

$$l * MWTA = 70 * (\lambda)^2$$

where $\lambda$ is equal to 65 nm.

Specialized FSM Architecture Delay Model

Next we describe the delay model used for embodiments of the present invention which consists the delay of both input sequence encoder and next state generation block. Looking at FIG. 14, the critical path delay reported by design compiler for the next state generation block starts from the output of the state register through the adder and two multiplexers back to the input of the state register. Note that, for the scenario when the next state calculation is solely calculated using the accumulator unit, the total critical path delay of the FSM architecture is equal to the critical path delay of the next state generation block. However, for the case where the next state calculation is performed through input sequence encoder and memory unit, the output of the state register is fed back to the input of the input sequence encoder. Therefore the critical path delay of the input sequence encoder along with the critical path delay of the next state generation block form the total delay of the architecture.

The delay of the input sequence encoder is obtained from VTR by mapping the encoder onto the baseline architecture. The delay values for the next state generation block are obtained from the design compiler. To account for the effect of the place and route on the delay values, we use the same experience-based estimation approach stated in G. Zgheib, L. Yang, Z. Huang, D. Novo, H. Parandeh-Afshar, H. Yang, and P. Ienne, "Revisiting And-Inverter Cones," *Proceedings Of The* 2014 *ACM/SIGDA International Symposium On Field-Programmable Gate Arrays*, pages 45-54, which suggests on average paths degrade by a factor of 1.6× after layout.

Note that we provide an optional binary-to-onehot decoder at the output of the FSM block. This decoder is located after the state registers, hence after obtaining the total critical path of design as mentioned above, we also add the latency of this decoder to the total critical path.

Baseline FPGA Architecture

The baseline FPGA architecture is also k6_frac_N10_40 nm. We selected the simple architecture without any hard block as the baseline to minimize the area overhead of unused hard blocks that the FSM will not benefit from.

CAD Flow

To synthesize our benchmarks onto the FPGA baseline and embodiments of the present invention, we use VTR 7.0. VTR provides the full synthesis, technology mapping, placement, and routing steps required to compile the next state generation hard block and input sequence encoder soft block onto the baseline FPGA architecture.

Mapping to the Next State Generation Block

As described above, for a given state machine to fit into the next state generation block, there are two required conditions to be met: (1) the number of bits required for the state encoding should not exceed the maximum bit-width of the adder, 2) the number of states that reside in memory should be less than the memory size.

To evaluate these two conditions, we first apply the state assignment algorithm on the given FSM. After performing the state encoding, we will have the number of state bits required to encode the state values and the total number of states that will be assigned to the memory unit. In case any of these two requirements are not met, we can use the FSM partitioning technique described above to map the FSM to two or more combined fracturable blocks.

Experimental Results

Below we discuss experimental results. We first use the result of applying the state assignment technique on the finite state machines extracted from MachSuite and the datacenter benchmarks to explain the sizing of the FSM block. We then evaluate the overall area and delay improvement of embodiments of the present invention over these benchmarks. We also provide the detail characteristics of each FSM to fully explain the variation in the result of area/delay improvement over these benchmarks. We then demonstrate the outcome of applying HLS optimization to three MachSuite benchmarks on the characteristics of the generated state machines. We finally assess the functionality of the FM partitioning algorithm on an FSM that does not fit into one FSM block and measure the overhead of the modifications to support fracturable FSM blocks.

Next State Generation Block Size

In one embodiment of the present invention, the size of the FSM block will accommodate the common FSM size, while reducing the amount of wasted resources if the common FSMs are smaller than the selected FSM block area.

Figure 24:
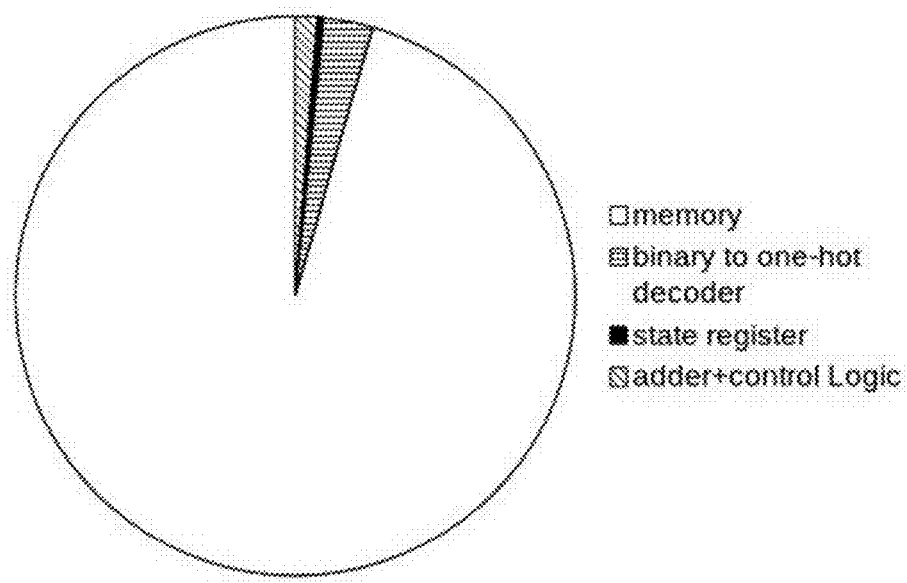
FIG. 24 illustrates area breakdown of the coarse-grained fabric.

FIG. 24 shows the area breakdown of each unit of the next state generation block as a fraction of the total area for the block configuration given in the table below:

| Total Memory size | 128x22 bits |
| --- | --- |
| Adder size | 8 bits |
| State Register size | 8 bits |
| Encoded Input Sequence size | 2 bits |

As can be seen in this figure, the memory block is the main contributor to the next state generation block area. We have measured the area breakdown of the block for various block configurations by sweeping the memory size, however, the memory unit always remains the main contributor to the block area since the area of the remaining units also scale accordingly as the memory size varies. Therefore, it is important to select a memory unit with the proper size to minimize the total area of embodiments of the present invention.

Figure 25:
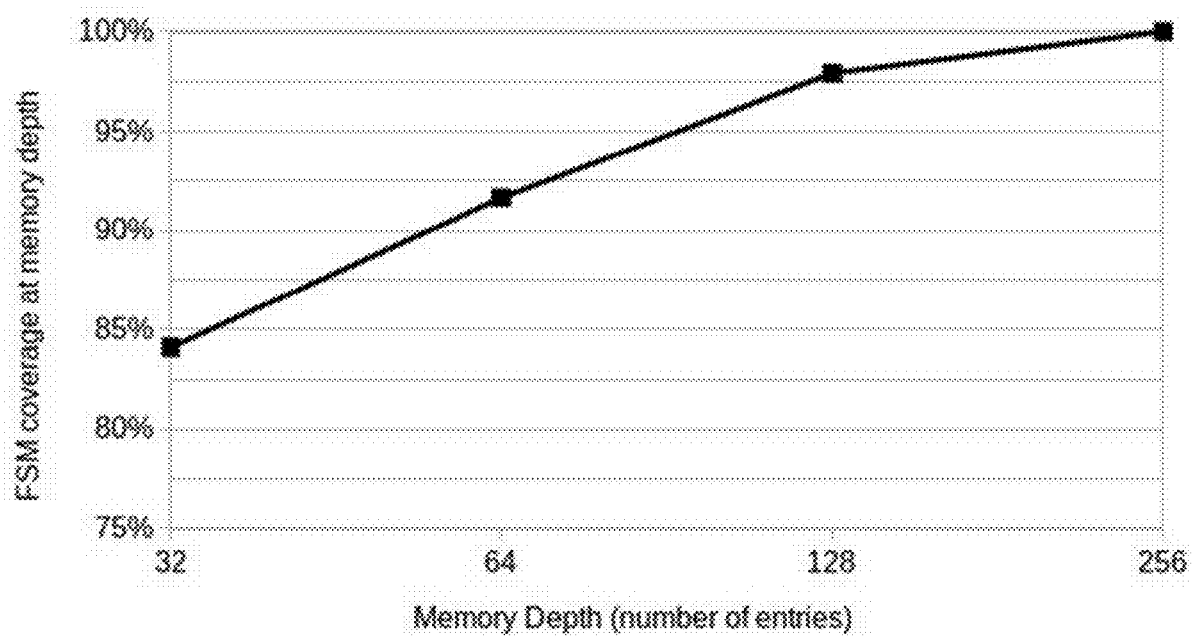
FIG. 25 illustrates FSM coverage vs. memory depth in number of entries.

We have collected the required memory depth, in terms of number of entries (independent states), for our evaluated benchmarks. FIG. 25 presents the fraction of the FSMs that will fit in a certain memory depth of 32, 64, 128, and 256 entries. For our workloads, 98% of the FSMs fit into a depth of 128. Thus, for the remainder of our evaluation, we selected a memory size with a depth of 128 entries to accommodate the common FSM sizes.

To address the bit-width of the adder, control registers, and encoding bits we analyze the total number of states for a state machine that uses all the 128 memory entries. This requires two data points: (1) what percentage of the states are typically allocated in memory, and (2) what is the maximum fan-out degree over our evaluated FSM. The second question helps determine how many memory rows are needed for each state.

The answer to the first question is shown in FIG. 8. On average approximately 18% of the states reside in memory.

The second question can be answered by looking at FIG. 9 which shows the maximum number of fan-out per state is equal to 4. Therefore, given a memory unit that has 4 memory rows associated with each state, and where the number of memory states is 20% of the total number of states, the total number of states in an FSM that can map to this memory unit is equal to (128 states/4 rows per state)× (1/20% of total states)=160 states. Hence we use 8 bits to represent the states in such a state machine. For any state machines that require more bits for the state encoding, there is a high chance that the memory size will not be able to accommodate all the states.

Using the format of memory content described above, the memory width should be equal to (size of Next State value+size of Path Final State value+size of Branch Target value+State Control value) which is 8+8+5+1=22 bits. This results in the size of the units in the next state generation block can be seen in the table above.

Area Improvement

Figure 28:
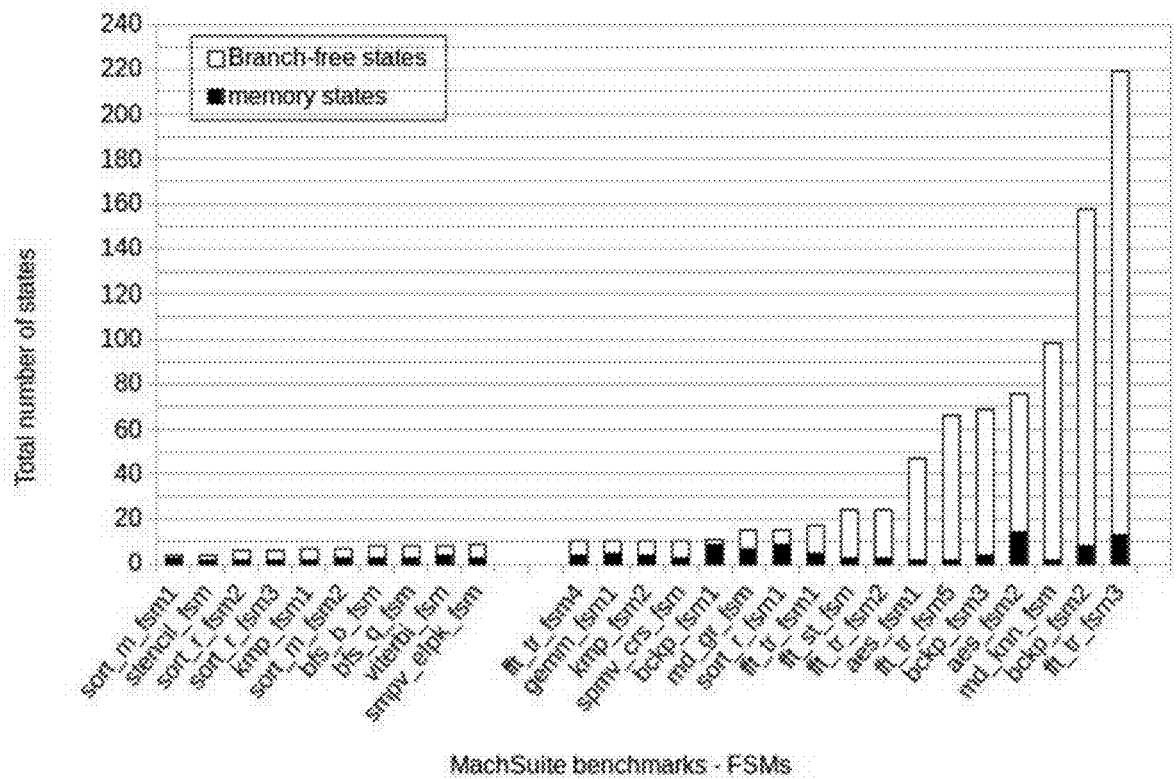
FIG. 28 illustrates FSM size and state category breakdown for MachSuite benchmarks.
Figure 29:
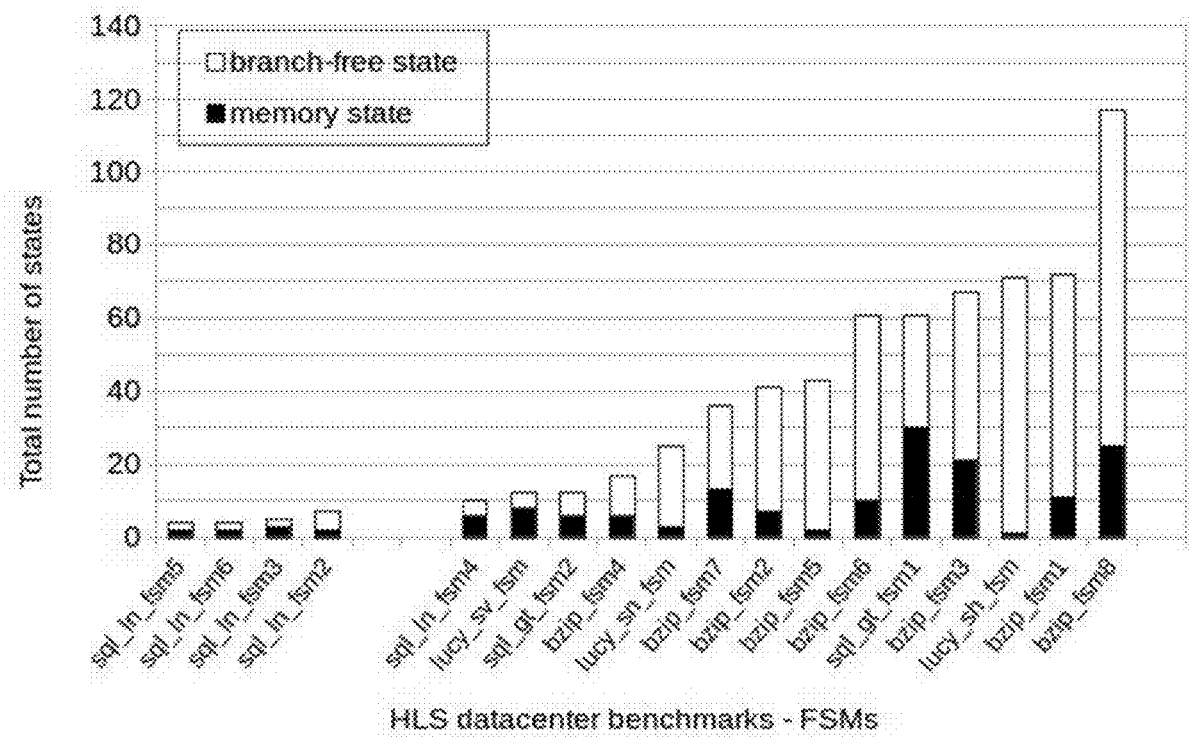
FIG. 29 illustrates FSM size and state category breakdown for HLS datacenter benchmarks.

Now we present the improvement in FSM area using embodiments of the present invention compared to the baseline LUT-based FSM implementation. The area of the next state generation block for the configuration given above is equal to 15662 um$^2$ which is calculated as described above. The area improvement for the MachSuite and HLS datacenter benchmarks is presented in FIGS. 26 and 27 respectively. FIGS. 28 and 29 present a breakdown of state categories for the MachSuite and HLS datacenter benchmarks respectively. The breakdown of state categories is collected after performing state assignment on each FSM.

Figure 26:
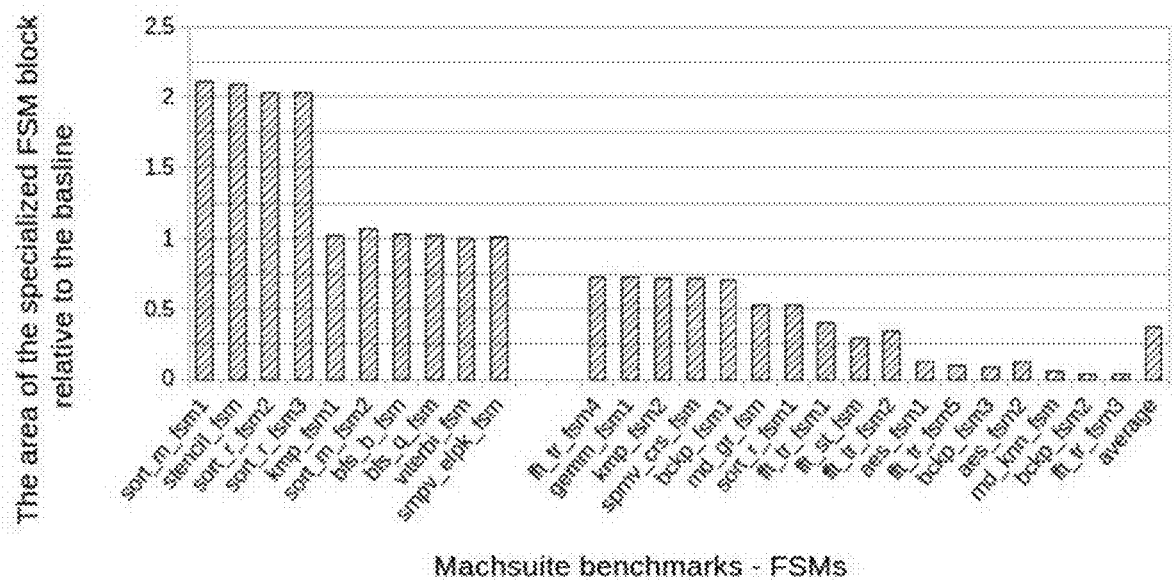
FIG. 26 illustrates area improvement for MachSuite benchmarks.
Figure 27:
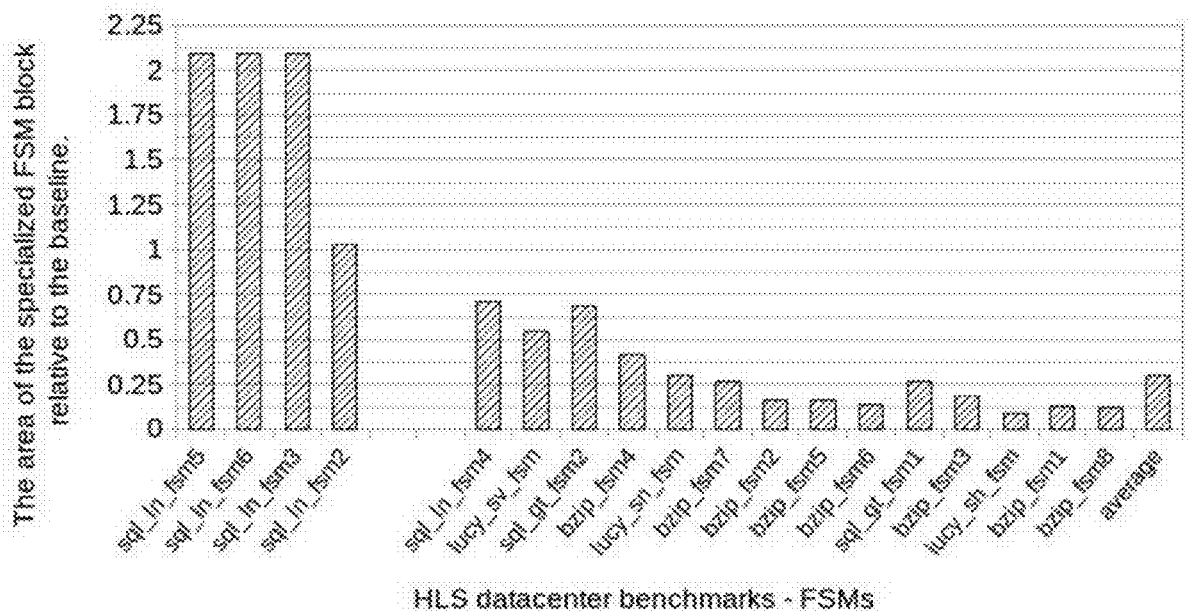
FIG. 27 illustrates area improvement for HLS datacenter benchmarks.

In FIGS. 26 and 27, the x-axis shows the FSMs extracted from the benchmark sets and the y-axis shows the relative area of embodiments of the present invention compared to the baseline LUT-based implementation. The gap between the bars on the x-axis separates the FSMs that have less than 10 states (on the left) from the FSMs with more than 10 states (on the right). In the extreme cases where the FSM only has a few states, less than 10, the number of states on the branch-free paths and the number of states to be stored in memory are so limited that it does not justify the area overhead of using the FSM hard block with a memory depth of 128. This issue can be addressed with two different approaches. First, a simple predictor based on the FSM size can be used during the synthesis to decide whether the FSM should be mapped to embodiments of the present invention or should be implemented using the soft logic on FPGAs. Second, the FSM block can be sized down to accommodate smaller FSMs. However, this also results in a lower percentage of FSMs fitting into a single block. The FSMs that do not fit into a single block will be split over multiple fracturable blocks. The overheads of having fracturable blocks are discussed in more detail below.

As shown in FIGS. 26 and 27, on average the area of embodiments of the present invention is approximately 36% of the baseline FPGA architecture for the MachSuite benchmarks, and is approximately 30% of the baseline area for the HLS datacenter benchmarks. These averages are not including the benchmarks that have FSMs with fewer than 10 states.

This illustrates that the area improvement increases as the FSM size increases. This is due to the increase in the amount of soft logic that is required to implement the baseline FSM, which is replaced by embodiments of the present invention.

FIGS. 28 and 29 explain the area improvements for different FSMs. The x-axis shows the FSMs from our evaluated benchmarks and the y-axis shows the total number of states as a breakdown of branch-free and memory states. The main trend that we see is that as the number of states that can be mapped to the branch-free paths increases, the area savings also increase. For the state machines that have the same number of states but a different area improvement, the complexity of the input sequence encoder is the main reason for the area difference. As the number of states that need to be stored in memory increases, the logic to implement the input sequence encoder will be more complex, resulting in having a larger area. This can be seen for bzip_fsm6 and sql_gt_fsm1. These benchmarks have the same number of states (61 states), however, the total number of states that reside in memory for sql_gt_fsm1 is equal to 30 while it is only 10 for bzip_fsm6. Consequently, as shown in FIG. 27, bzip_fsm6 has a smaller area (14% of the baseline) compared to sql_gt_fsm1 (27% of the baseline). However, one exception is with benchmarks lucy_sv_fsm and sql_gt_fsm2 where benchmark lucy_sv_fsm has more memory states and better area improvement than sql_gt_fsm2. This is likely due to the higher complexity of the next state calculation logic for benchmark lucy_sv_fsm than benchmark sql_gt_fsm2, which results in a greater area reduction when mapping to a simple memory lookup.

Delay Improvement

Figure 30:
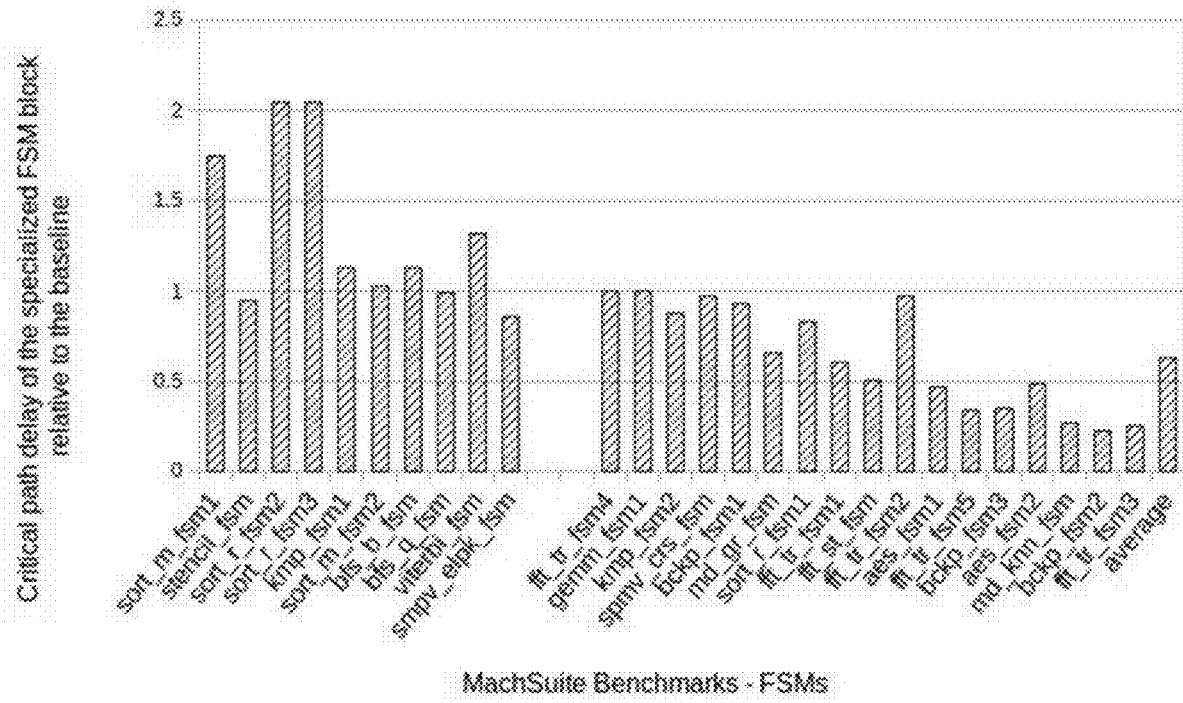
FIG. 30 illustrates critical path delay improvement for MachSuite benchmarks.
Figure 31:
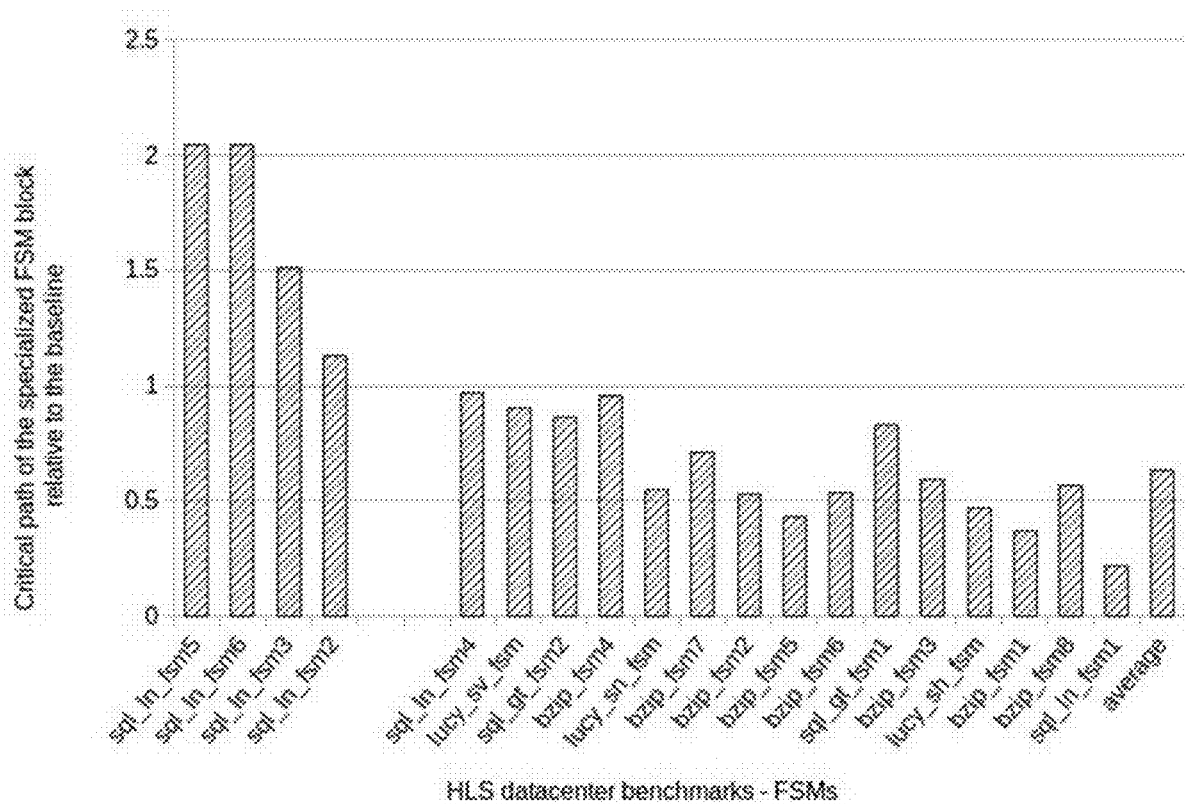
FIG. 31 illustrates critical path delay improvement for HLS datacenter benchmarks.

The input to output delay of the next state generation block for the configuration given above is equal to 0.5 ns, which is calculated as described above. The delay improvement achieved by embodiments of the present invention is shown in FIGS. 30 and 31 for the evaluated benchmarks. The x-axis shows the FSMs from the different benchmarks and the y-axis shows the critical path, relative to the baseline. As above, the FSMs with less than 10 states are separated from the FSMs with more than 10 states by a gap. As with area savings, the FSMs with at least 10 states will benefit from embodiments of the present invention, and the critical path delay improves as the size and complexity of the FSM increases. This is due to the fact that, for smaller FSMs, the overhead of the extra control logic in the FSM blocks is not negligible compared to the critical path delay of the LUT-based portion of the FSM.

Similar to the area results, the complexity of the input sequence encoder is a large contributor to the critical path of the total design, which is indicated by the number of states that are mapped to memory, as shown in FIGS. 28 and 29.

Resource Usage of the Mix-Grained Architecture

Figure 32:
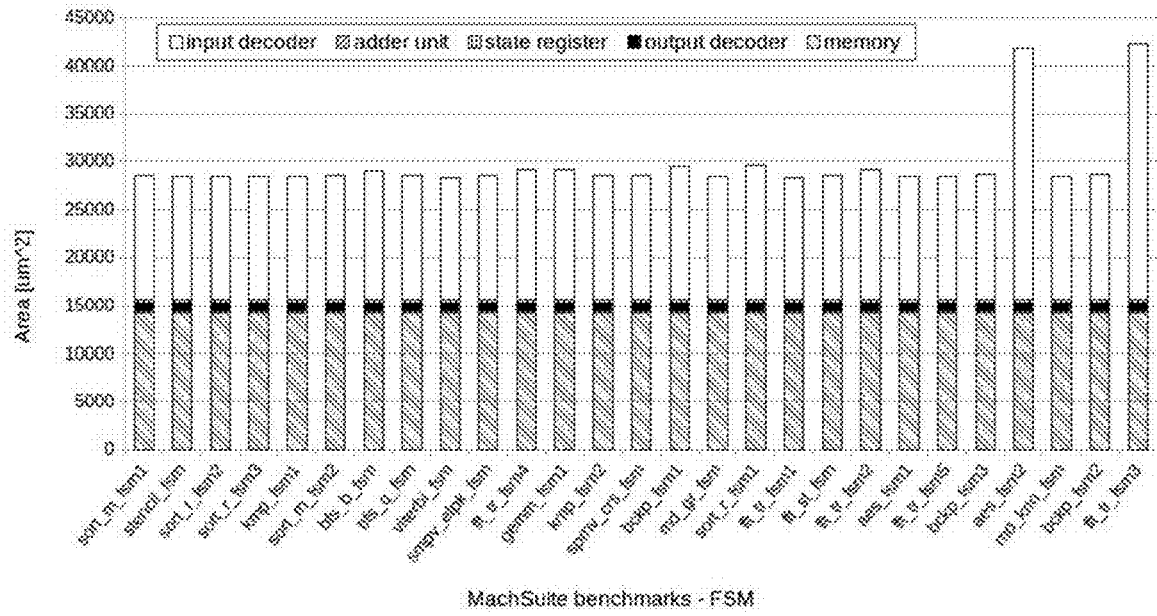
FIG. 32 illustrates area breakdown for MachSuite benchmarks.
Figure 33:
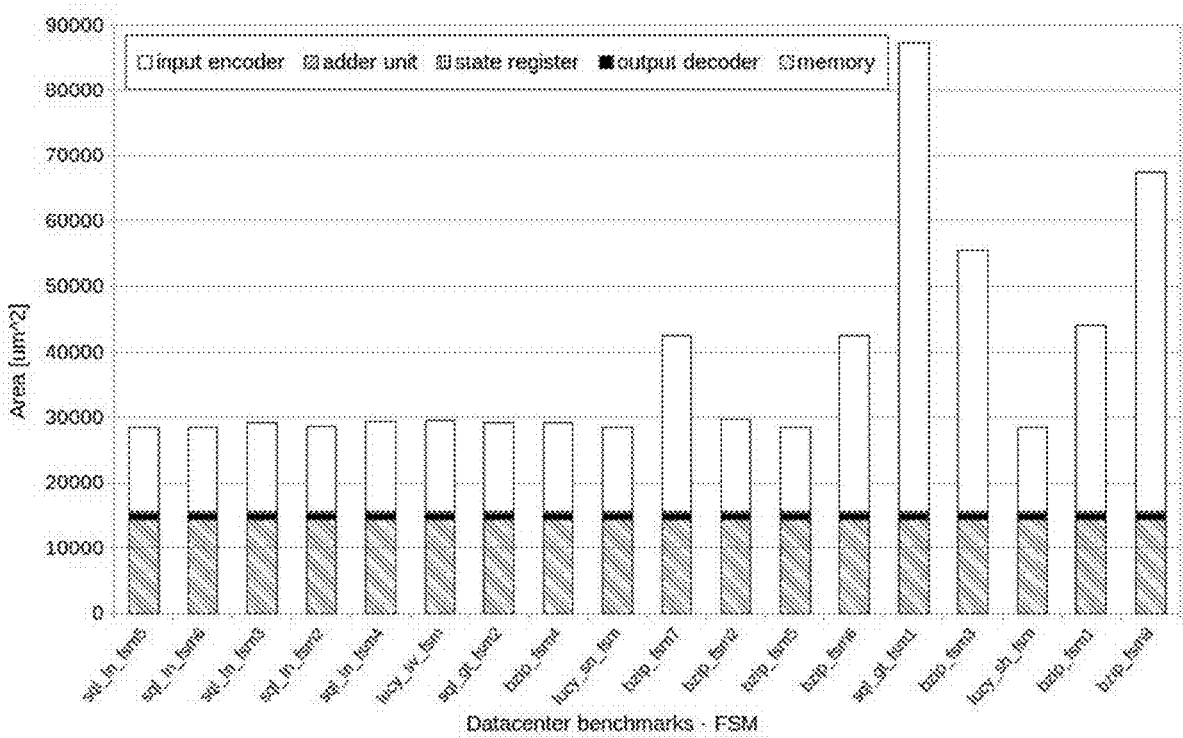
FIG. 33 illustrate area breakdown for HLS datacenter benchmarks.

FIGS. 32 and 33 illustrate the area of each unit as a fraction of the total area of the mix-grained architecture for the same workloads presented in FIGS. 26 and 27. As this result shows, about 50% of the area is consumed by the input sequence encoder. This amount varies among the benchmarks as size of the FSM and more specifically, number of states that reside in memory varies. However, in addition to the number of memory states, the complexity of the Boolean function that defines the transition between states also affects the complexity and size of the input sequence encoder. As can be seen in FIG. 28, the number of memory states among MachSuite benchmarks is mainly less than 10, independent of the FSM size. This results in small variation in size of the input sequence encoder among MachSuite benchmarks. However, for the Datacenter benchmarks (FIG. 29), there is a higher variation in number of memory states among different benchmarks, hence there is more variation in size of the input sequence encoder for these benchmarks as well.

The area of the hard block, consisting of the memory, adder unit, and output decoder is always fixed. This explain the increase in area savings for the larger FSMs, since the overhead of the control logic in the hard block will be negligible compared to the input encoder implemented using the FPGA soft logic.

FSM Area

Along with the area improvement of the FSMs, we are also interested in the fraction of the FSM next state calculation area to the total application design area (control plus data-path). We were able to measure this fraction for the SQLite benchmark (from the datacenter benchmark set)

which does not contain any IP cores. The percentage of the area for the next state calculation logic for two functions of SQLite benchmark is shown in the table below:

| benchmark | area percentage of the FSM next state calculation logic | total number of the states |
|---|---|---|
| sqlite ln | 11.27% | 508 |
| sqlite gt | 9.12% | 73 |

On average for these two functions, the next state calculation logic area is approximately 10.19% of the total design area.

Impact of HLS Directives on the Generated FSMs

To evaluate the impact of HLS optimization on FSM characteristics, we have applied a set of HLS directives that minimize the area-delay product of the aes, backprop, and sort radix benchmarks. Previously we have described how these HLS settings have been obtained.

Figure 34:
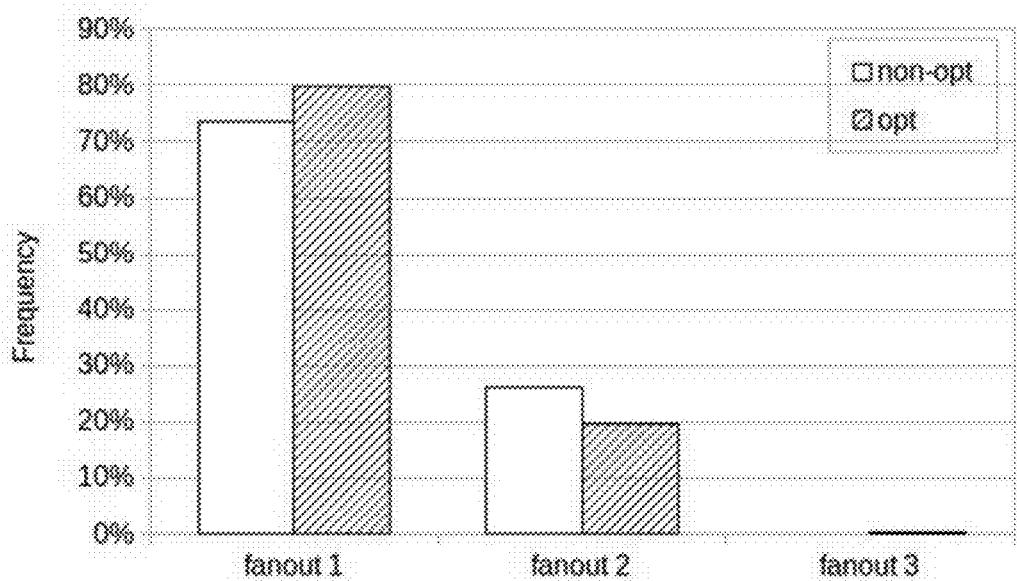
FIG. 34 illustrates the impact of applying HLS optimization directives on three benchmarks from MachSuite.

The impact of applying HLS directives on the three mentioned MachSuite benchmarks is shown in FIG. 34, and is averaged across these benchmarks. These benchmarks were arbitrarily chosen to show the impact of HLS directives. The x-axis is labelled by the number of fan-outs per state, and the y-axis indicates the fraction of total states that have the corresponding fan-out degree. As can be seen, on average, the optimized designs (opt) have a higher number of branch-free paths than the non-optimized designs (no-opt), e.g., fan-out 1 is higher for the pragma optimized (opt) versus non-optimized (non-opt) versions.

Many of the HLS directives attempt to exploit more parallelism, for example, by loop unrolling and loop pipelining. In these cases, it results in an increase in the number of states to generate the control signals for the unrolled and pipeline loops, adding more branch-free states in between divergent states used to control the loops.

Efficiency of the Fracturable FSM Block

Now we evaluate the efficiency of embodiments of the present invention for the scenario where a large FSM does not map to one FSM block. We perform analysis on an FSM with 508 states, which is extracted from the sqlite_lookup-Name function. The corresponding FSM is named sql_ln_fsm1. Below we describe the required steps for mapping this FSM to two fracturable FSM blocks.

Block size: The table below shows the block size information for the sql_ln_fsm1 FSM:

| Benchmark | States | Required state bits | Memory states | Required mem. depth | Max fan-out |
|---|---|---|---|---|---|
| sql ln fsm 1 | 508 | 9 | 40 | 160 | 4 |

The FSM has 508 states, which requires 9 state bits, thus it is too large to map to the FSM block described above with only 8 state bits and an 8 bit-wide adder. Additionally, the result of the state encoding shows that 40 states are mapped to the memory unit. The maximum number of fan-out per state for this FSM is equal to 4, thus we need 2 bits to represent the encoded input, which allows each memory states to have a maximum of four corresponding memory rows to store the data for potential state transitions. Therefore, a memory unit with 160 entries is required to accommodate this FSM, which will not fit into the FSM block described above with 128 entries.

Partitioning: The table below describes the result of applying the Fiduccia-Mattheyses partitioning algorithm on sql_ln_fsm1, as described above, and then re-performing the state assignment on each of these partitions:

| | Partition A | Partition B |
|---|---|---|
| Initial number of memory states | 24 | 16 |
| Number of overhead memory states | 6 | 6 |
| Refined number of memory states | 30 | 22 |
| Refined required memory size | 120 | 88 |

The first row indicates the number of states that are required to be mapped to the memory unit in each FSM partition. The second row presents the overhead of partitioning in terms of the number of states that are required to be mapped to the memory to store the information corresponding to the transitions across the fracturable blocks. The third and fourth row show the total number of memory states for each FSM partition and the required memory size to accommodate them. Row 4 indicates that FSM partition A requires a memory unit of size 120 and FSM partition B requires a memory unit of size 88, thus they both can be mapped to a fracturable FSM block of the design described above.

The values for the refined required memory sizes indicate that the partitioning can result in an unbalanced division of the required memory size between partitions. The partitioning algorithm aims to minimize the cut set value between two partitions, however, it is possible to have different number of branches within each partition. A more sophisticated partitioning algorithm can be used that also balances this number in addition to minimizing the cut set value to better utilize each fracturable block.

Figure 35:
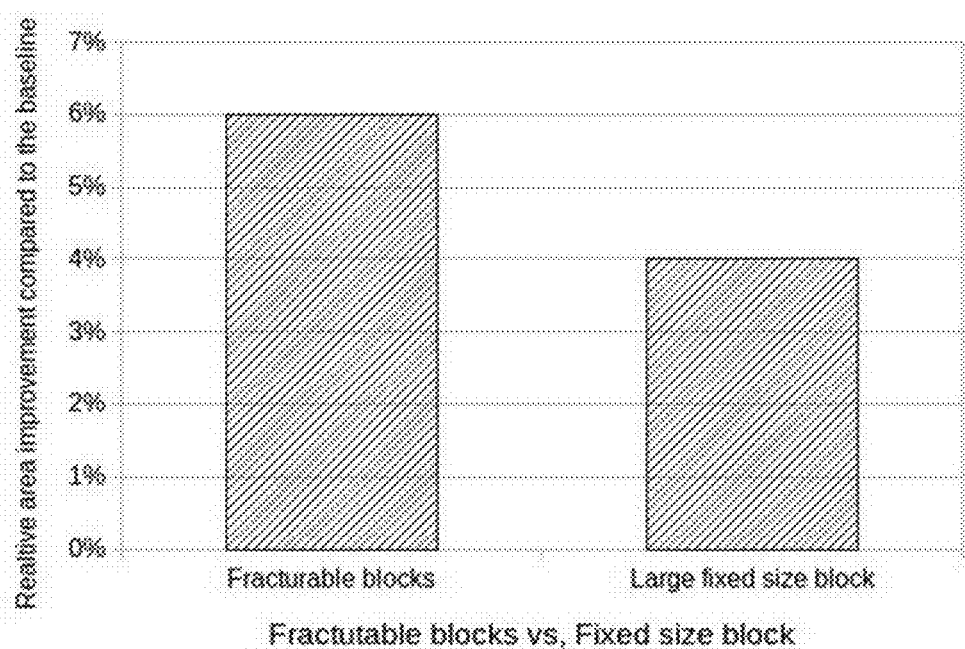
FIG. 35 illustrates area overhead of using a fracturable FSM block to map a large FSM.

Area saving: FIG. 35 shows the area overhead of using a fracturable FSM block to map a large FSM as opposed to having one large specialized FSM block to fit the FSM. LUT-based implementation of the FSM in FPGA soft logic is used as the baseline. The area overhead due to making the FSM block fracturable is negligible compared to the area improvement gained by mapping the FSM to the FSM hard block.

The results of splitting a large FSM over two fracturable blocks show the efficiency of this approach for a medium size FSM block (a memory unit with 256 entries). As shown in the table above, partitioning an FSM results in storing additional states in memory. For the smaller FSM blocks, e.g. a memory unit with 128 entries, there are only 32 states that can be stored in memory (assuming each state has 4 memory locations for 4 potential next states). This memory size offers a very limited space for storing states. By adding the overhead of additional states that are caused by partitioning, this memory unit can easily become full which leads to requiring more than two fracturable blocks to accommodate a given medium size FSM. This might result in extra overhead that is more than the amount shown in FIG. 35.

Embodiments of the present invention are not limited to implementing FSMs with low fan-out degree. FSMs that contain a few high fan-out states can be partitioned in a way that the high fan-out states are grouped together in a different partition than the rest. Then, the high fan-out partition can be implemented as part of the FPGA soft logic and the other partition can be mapped to the specialized FSM block.

There is a large body of work looking at using specialized hard blocks as part of the FPGA's architecture. For example, Wilton et al. (see S. J. E. Wilton, J. Rose, and Z. Vranesic, "Architectures and Algorithms for Field-Programmable Gate Arrays With Embedded Memory," University of Toronto, Toronto, Ont., Canada, 1997) examines the architecture of FPGAs containing coarse-grained memory blocks, Langhammer et al. (see M. Langhammer and B. Pasca, "Floating-Point DSP Block Architecture For FPGAs," *Proceedings of the* 2015 *ACM/SIGDA International Symposium on Field-Programmable Gate Arrays*, pages 117-125) proposes DSP blocks that support floating point operation, and all modern FPGAs, including Xilinx and Altera devices, now contain specialized hard blocks as part of their architecture. This work introduces specialized blocks to the FPGA's architecture that perform a set of specific tasks. However, they look at improving the complex operations and functional units that are common in the data-path part of hardware designs, in contrast to embodiments of the present invention that better implements the control-path portion of digital systems.

Garcia-Vargas et al. (see I. Garcia-Vargas, R. Senhadji-Navarro, G. Jimenez-Moreno, A. Civit-Balcells, and P. Guerra-Gutierrez, "ROM-Based Finite State Machine Implementation In Low Cost FPGAs," *IEEE International Symposium on Industrial Electronics,* 2007, pages 2342-2347) proposes to use block RAMs provided in modern FPGA architecture to implement FSMs. This work looks at implementing the next state/output calculation for every state using memory and it reduces the size of the memory by multiplexing the FSM inputs to choose the set of active inputs at each state. Additionally, along with the next state and output values, extra control signals are stored at each memory location to help reduce the complexity of controlling the multiplexer. Embodiments of the present invention also reduce the memory size by exploiting the fact that only a subset of inputs are active at each state but in addition further optimize the memory size by introducing an input encoder which exploits the fact that not all the combinations of the active inputs contribute to different choices of next state selection. For example, in a scenario where the maximum number of active inputs at one state is three, previous solutions look at having 8 ($2^3$) memory locations for choosing the potential next state for a given state. In contrast, embodiments of the present invention utilize a number of memory locations that is further reduced to the maximum number of reachable next states per state which is normally less than two to the power of the number of active inputs. Moreover, embodiments of the present invention further reduces the number of states that are implemented in memory by looking at the characteristics of HLS-generated benchmarks. By utilizing a hybrid FSM implementation, the task of next state calculation is divided between the memory unit and an accumulator unit, resulting in significant reduction in number of states that are mapped to the memory and consequently reducing the memory size.

Glaser et al. (see J. Glaser, M. Damm, J. Haase, and C. Grimm, "TR-FSM: Transition-Based Reconfigurable Finite State Machine," *ACM Transactions on Reconfigurable Technology and Systems* (*TRETS*), 4(3):23, 2011) presents a reconfigurable FSM architecture, TR-FSM, to be implemented as part of the ASICs or System on a Chip (SOC) designs. TR-FSM offers reduced area, delay, and power consumption compared to an FPGA baseline, however, it must be sized according to the specifications of the FSMs that are going to be implemented onto this architecture, otherwise the extra resources will be wasted. TR-FSM is possible in case of ASIC and SOC design for a certain class of applications where they can profile FSMs prior to generating the TR-FSM block. However, TR-FSM cannot be utilized as a general architecture where the size of FSMs is not known in advance, limiting the feasibility for integrating their proposed architecture into the FPGA architecture. In contrast, embodiments of the present invention can be utilized in common FSM sizes, while still allowing the mapping of larger FSMs using the disclosed fracturable architecture.

Wilson et al. (D. Wilson and G. Stitt, "A Scalable, Low-Overhead Finite-State Machine Overlay for Rapid FPGA Application Development," arXiv preprint arXiv: 1705.02732, 2017) propose a low overhead FSM overlay based on a multi-RAM architecture. They aim to improve the area usage of the previously proposed memory-based overlays by grouping the state machines to different subsets based on the number of active inputs at each state. The states at each subset are then mapped to separate memory units such that each memory address space can be tailored to the number of active inputs in each subset. Their solution, however, still has a larger area compared to the LUT implementation, since the main goal of their work is to reduce the FPGA compilation time.

The present invention is described in: S. Assadikhomami, *A Mix-Grained Architecture For Improving HLS-Generated Controllers On FPGAs*, Master's Thesis, University of British Columbia, Vancouver, Canada, June 2017 (published June 2018), incorporated herein by reference. The present invention is also described in S. Assadikhomami, J. Ongko, and T. Aamodt, "A State Machine Block for High-Level Synthesis", 2017 *International Conference on Field Programmable Technology* (*ICFPT*), 11-13 Dec. 2017, incorporated herein by reference.

The present invention has been described above in connection with several preferred embodiments. This has been done for purposes of illustration only, and variations of the inventions will be readily apparent to those skilled in the art and also fall within the scope of the invention.

The invention claimed is:

1. A state machine block that implements a control path of a finite state machine comprising:
   a state register storing a current state value;
   an input sequence encoder that receives one or more external input signals and said current state value and generates one or more encoded sequence signals;
   a memory unit that receives said one or more encoded sequence signals and at least a portion of said current state value and generates a memory unit next state value and one or more state control signals;
   an accumulator unit that receives one or more of said state control signals and said current state value and is configured to perform an arithmetic operation on said current state value to generate an accumulator unit next state value; and
   a control unit that receives said memory unit next state value and said accumulator unit next state value and one or more of said state control signals and wherein said control unit determines a next state of the finite state machine based on either the accumulator next state value or the memory unit next state value,
   wherein said accumulator unit determines a next state for the finite state machine when said current state value represents a state on a branch-free path of the finite state machine.

2. A state machine block that implements a control path of a finite state machine comprising:
   a state register storing a current state value;
   an input sequence encoder that receives one or more external input signals and said current state value and generates one or more encoded sequence signals;
   a memory unit that receives said one or more encoded sequence signals and at least a portion of said current state value and generates a memory unit next state value and one or more state control signals;

an accumulator unit that receives one or more of said state control signals and said current state value and is configured to perform an arithmetic operation on said current state value to generate an accumulator unit next state value; and a control unit that receives said memory unit next state value and said accumulator unit next state value and one or more of said state control signals and wherein said control unit determines a next state of the finite state machine based on either the accumulator next state value or the memory unit next state value, wherein said memory unit determines a next state for the finite state machine when said current state value represents a state that is not within a branch-free path of the finite state machine.

3. A state machine block that implements a control path of a finite state machine comprising:

a state register storing a current state value;

an input sequence encoder that receives one or more external input signals and said current state value and generates one or more encoded sequence signals;

a memory unit that receives said one or more encoded sequence signals and at least a portion of said current state value and generates a memory unit next state value and one or more state control signals;

an accumulator unit that receives one or more of said state control signals and said current state value and is configured to perform an arithmetic operation on said current state value to generate an accumulator unit next state value; and a control unit that receives said memory unit next state value and said accumulator unit next state value and one or more of said state control signals and wherein said control unit determines a next state of the finite state machine based on either the accumulator next state value or the memory unit next state value, wherein said accumulator unit comprises an adder configured such that an increment by one is performed on said current state value to produce said accumulator unit next state value.

4. A state machine block that implements a control path of a finite state machine comprising:

a state register storing a current state value;

an input sequence encoder that receives one or more external input signals and said current state value and generates one or more encoded sequence signals;

a memory unit that receives said one or more encoded sequence signals and at least a portion of said current state value and generates a memory unit next state value and one or more state control signals;

an accumulator unit that receives one or more of said state control signals and said current state value and is configured to perform an arithmetic operation on said current state value to generate an accumulator unit next state value; and a control unit that receives said memory unit next state value and said accumulator unit next state value and one or more of said state control signals and wherein said control unit determines a next state of the finite state machine based on either the accumulator next state value or the memory unit next state value, wherein said accumulator unit comprises one or more registers that store one or more of said state control signals.

5. The state machine block of claim 4 wherein said one or more registers comprise a branch target register.

6. The state machine block of claim 4 wherein said one or more registers comprise a path final state register.

7. The state machine block of claim 4 wherein said accumulator unit determines if said current state value represents a final state of a branch-free path of the finite state machine.

8. The state machine block of claim 7 wherein said one or more registers comprise a path final state register and said accumulator unit comprises a comparator that compares said current state value with the contents of said final state register.

9. A state machine block that implements a control path of a finite state machine comprising:

a state register storing a current state value;

an input sequence encoder that receives one or more external input signals and said current state value and generates one or more encoded sequence signals;

a memory unit that receives said one or more encoded sequence signals and at least a portion of said current state value and generates a memory unit next state value and one or more state control signals;

an accumulator unit that receives one or more of said state control signals and said current state value and is configured to perform an arithmetic operation on said current state value to generate an accumulator unit next state value; and a control unit that receives said memory unit next state value and said accumulator unit next state value and one or more of said state control signals and wherein said control unit determines a next state of the finite state machine based on either the accumulator next state value or the memory unit next state value, wherein said control unit comprises a multiplexor that selects between said accumulator next state value and said memory unit next state value based on one or more of said state control signals.

10. The state machine block of claim 9 wherein said multiplexor selects between said accumulator next state value and said memory unit next state value based on a signal from said accumulator unit.

11. A state machine block that implements a control path of a finite state machine comprising:

a state register storing a current state value;

an input sequence encoder that receives one or more external input signals and said current state value and generates one or more encoded sequence signals;

a memory unit that receives said one or more encoded sequence signals and at least a portion of said current state value and generates a memory unit next state value and one or more state control signals;

an accumulator unit that receives one or more of said state control signals and said current state value and is configured to perform an arithmetic operation on said current state value to generate an accumulator unit next state value; and a control unit that receives said memory unit next state value and said accumulator unit next state value and one or more of said state control signals and wherein said control unit determines a next state of the finite state machine based on either the accumulator next state value or the memory unit next state value, wherein said memory unit receives a proper subset of the bits of said current state value.

12. The state machine block of claim 11 wherein said proper subset comprises least significant bits of the current state value.

13. A state machine block that implements a control path of a finite state machine comprising:
- a state register storing a current state value;
- an input sequence encoder that receives one or more external input signals and said current state value and generates one or more encoded sequence signals;
- a memory unit that receives said one or more encoded sequence signals and at least a portion of said current state value and generates a memory unit next state value and one or more state control signals;
- an accumulator unit that receives one or more of said state control signals and said current state value and is configured to perform an arithmetic operation on said current state value to generate an accumulator unit next state value;
- a control unit that receives said memory unit next state value and said accumulator unit next state value and one or more of said state control signals and wherein said control unit determines a next state of the finite state machine based on either the accumulator next state value or the memory unit next state value; and
- a state decoder that receives said current state value and generates output signals.

14. The state machine block of claim 13 wherein said state decoder comprises a binary to one-hot decoder.

15. A state machine block that implements a control path of a finite state machine comprising:
- a state register storing a current state value;
- an input sequence encoder that receives one or more external input signals and said current state value and generates one or more encoded sequence signals;
- a memory unit that receives said one or more encoded sequence signals and at least a portion of said current state value and generates a memory unit next state value and one or more state control signals;
- an accumulator unit that receives one or more of said state control signals and said current state value and is configured to perform an arithmetic operation on said current state value to generate an accumulator unit next state value; and
- a control unit that receives said memory unit next state value and said accumulator unit next state value and one or more of said state control signals and wherein said control unit determines a next state of the finite state machine based on either the accumulator next state value or the memory unit next state value, wherein one or more of the set consisting of said input sequence encoder, said memory unit, said arithmetic unit and said control unit is implemented within a specialized hard block within a field programmable gate array (FPGA).

16. A state machine block that implements a control path of a finite state machine comprising:
- a state register storing a current state value;
- an input sequence encoder that receives one or more external input signals and said current state value and generates one or more encoded sequence signals;
- a memory unit that receives said one or more encoded sequence signals and at least a portion of said current state value and generates a memory unit next state value and one or more state control signals;
- an accumulator unit that receives one or more of said state control signals and said current state value and is configured to perform an arithmetic operation on said current state value to generate an accumulator unit next state value; and
- a control unit that receives said memory unit next state value and said accumulator unit next state value and one or more of said state control signals and wherein said control unit determines a next state of the finite state machine based on either the accumulator next state value or the memory unit next state value, wherein said memory unit, said arithmetic unit and said control unit are all implemented within a specialized hard block within a field programmable gate array (FPGA).

17. A state machine block that implements a control path of a finite state machine comprising:
- a state register storing a current state value;
- an input sequence encoder that receives one or more external input signals and said current state value and generates one or more encoded sequence signals;
- a memory unit that receives said one or more encoded sequence signals and at least a portion of said current state value and generates a memory unit next state value and one or more state control signals;
- an accumulator unit that receives one or more of said state control signals and said current state value and is configured to perform an arithmetic operation on said current state value to generate an accumulator unit next state value; and
- a control unit that receives said memory unit next state value and said accumulator unit next state value and one or more of said state control signals and wherein said control unit determines a next state of the finite state machine based on either the accumulator next state value or the memory unit next state value, wherein one or more of the set consisting of said input sequence encoder, said memory unit, said arithmetic unit and said control unit is implemented using a hardware accelerator.

18. A state machine block that implements a control path of a finite state machine comprising:
- a state register storing a current state value;
- an input sequence encoder that receives one or more external input signals and said current state value and generates one or more encoded sequence signals;
- a memory unit that receives said one or more encoded sequence signals and at least a portion of said current state value and generates a memory unit next state value and one or more state control signals;
- an accumulator unit that receives one or more of said state control signals and said current state value and is configured to perform an arithmetic operation on said current state value to generate an accumulator unit next state value; and
- a control unit that receives said memory unit next state value and said accumulator unit next state value and one or more of said state control signals and wherein said control unit determines a next state of the finite state machine based on either the accumulator next state value or the memory unit next state value, wherein one or more of the set consisting of said input sequence encoder, said memory unit, said arithmetic unit and said control unit is implemented using soft logic as part of a field programmable gate array (FPGA).

19. The state machine block of claim 18 wherein said soft logic is part of a look up table (LUT) based cluster.

20. The state machine block of claim 18 wherein said soft logic is part of a block RAM.

21. A method of assigning state values in a finite state machine implemented in a state machine block with a memory unit that stores next state values for independent states and an accumulator unit that computes next state values for branch-free path states, the method comprising the steps of:
  identifying branch-free paths between each pair of divergent nodes;
  eliminating overlap by processing, for each divergent node d, each branch-free path terminating in node d to generate a new set of branch-free paths that have distinct states, wherein said step of eliminating identifies nodes in the finite state machine as being either memory unit nodes or arithmetic unit nodes;
  assigning state values such that nodes identified as memory unit nodes are numbered such that they are uniquely identified by a subset of state bits and nodes identified as arithmetic unit nodes are assigned sequential state values for states within the same branch-free path.

22. The method of claim 21 wherein said step of identifying comprises the steps of:
  putting all divergent nodes in a set D;
  putting all branch-free paths that start from a node in set D and end in another node in set D into a set P.

23. The method of claim 21 wherein said step of eliminating comprises the steps of:
  applying a path refinement algorithm on a set of branch-free paths to eliminate overlap of nodes on different branch-free paths by cutting one or more branch-free paths and labeling one or more nodes as independent nodes;
  identifying divergent nodes and independent nodes as memory unit nodes and identifying branch-free path nodes as arithmetic unit nodes.

24. The method of claim 21 wherein said step of assigning comprises the steps of:
  numbering all memory unit nodes such that a proper subset of state bits is sufficient to uniquely identify each memory unit node;
  numbering all arithmetic unit nodes consecutively such that nodes on the same branch-free path have their next state value one greater than their current value.

25. The method of claim 24 wherein said proper subset consist of a contiguous group of least significant state bits.

26. The method of claim 23 wherein said path refinement algorithm comprises the steps of:
  identifying a set of branch-free paths that all terminate in the same divergent node;
  sorting said set of branch-free paths based on their path length;
  traversing each path within said set of branch-free paths in order from a longest path to a shortest path by comparing each of its vertices to determine overlap with previously traversed paths;
  modifying said branch-free path such that overlap is eliminated.

27. The method of claim 26 wherein said step of modifying comprises the steps of:
  cutting an overlapping branch-free path so that it no longer overlaps any previously traversed paths;
  labeling a node where a cut was made as an independent node.

28. The method of claim 26 wherein said step of modifying comprises the steps of:
  replicating states in an overlapping branch-free path to eliminate overlap with any previously traversed paths.

29. The method of claim 23 wherein said step of assigning comprises the steps of:
  numbering memory unit nodes such that a proper subset of state bits is sufficient to uniquely identify each memory unit node;
  numbering arithmetic unit nodes consecutively such that nodes on the same branch-free path have their next state value one greater than their current value.

* * * * *